(12) United States Patent
Venkatraman et al.

(10) Patent No.: US 9,426,621 B2
(45) Date of Patent: Aug. 23, 2016

(54) BASE STATION LOCATION DETERMINATION

(71) Applicant: Verizon Patent and Licensing Inc., Basking Ridge, NJ (US)

(72) Inventors: Shankar Venkatraman, San Jose, CA (US); Lee K. Tjio, Danville, CA (US); Jin Yang, Orinda, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 73 days.

(21) Appl. No.: 14/189,481

(22) Filed: Feb. 25, 2014

(65) Prior Publication Data
US 2015/0245176 A1    Aug. 27, 2015

(51) Int. Cl.
*H04W 64/00* (2009.01)
*H04W 4/02* (2009.01)

(52) U.S. Cl.
CPC ..................... *H04W 4/023* (2013.01)

(58) Field of Classification Search
CPC ........................................... H04W 4/23
USPC ............................... 455/456, 404.2
See application file for complete search history.

(56) References Cited

U.S. PATENT DOCUMENTS

| | | | |
|---|---|---|---|
| 7,319,878 B2 * | 1/2008 | Sheynblat et al. | 455/456.3 |
| 7,577,443 B1 * | 8/2009 | Moll | H04W 64/00 370/328 |
| 7,751,833 B2 * | 7/2010 | Mansour et al. | 455/456.2 |
| 2008/0132247 A1 * | 6/2008 | Anderson | 455/456.2 |
| 2010/0120394 A1 * | 5/2010 | Mia et al. | 455/404.2 |
| 2010/0297981 A1 * | 11/2010 | Ballantyne | H04M 1/72536 455/404.2 |

* cited by examiner

*Primary Examiner* — Allahyar Kasraian
*Assistant Examiner* — Farid Seyedvosoghi

(57) ABSTRACT

A device may determine to initiate a location determination for a base station. The device may identify a set of positioning measurements associated with the location determination. The device may identify a set of other devices to be associated with the set of positioning measurements. The device may provide configuration information for the set of positioning measurements to the set of other devices. The device may determine information associated with the set of positioning measurements based on providing the configuration information. The device may determine a location in which the base station is located based on determining the information associated with the set of positioning measurements.

20 Claims, 19 Drawing Sheets

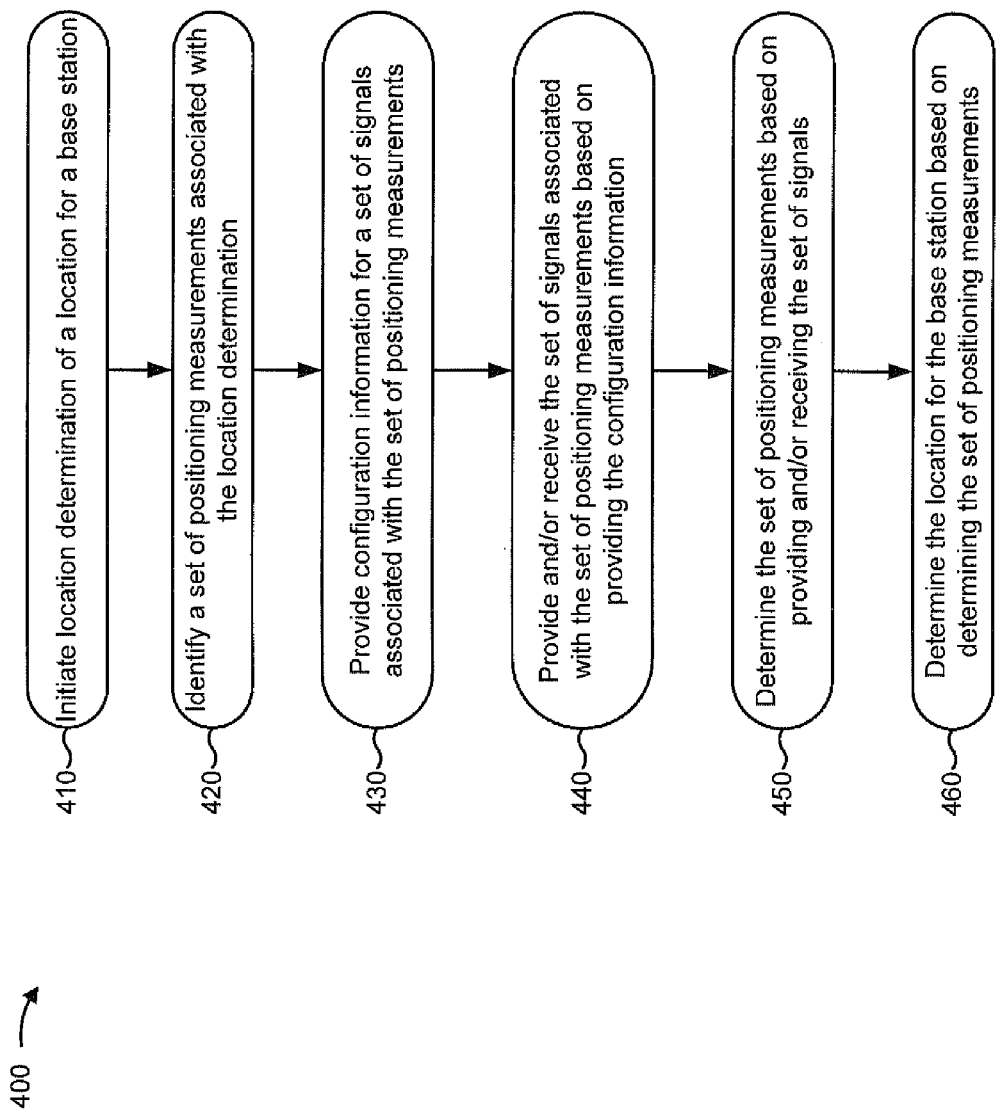

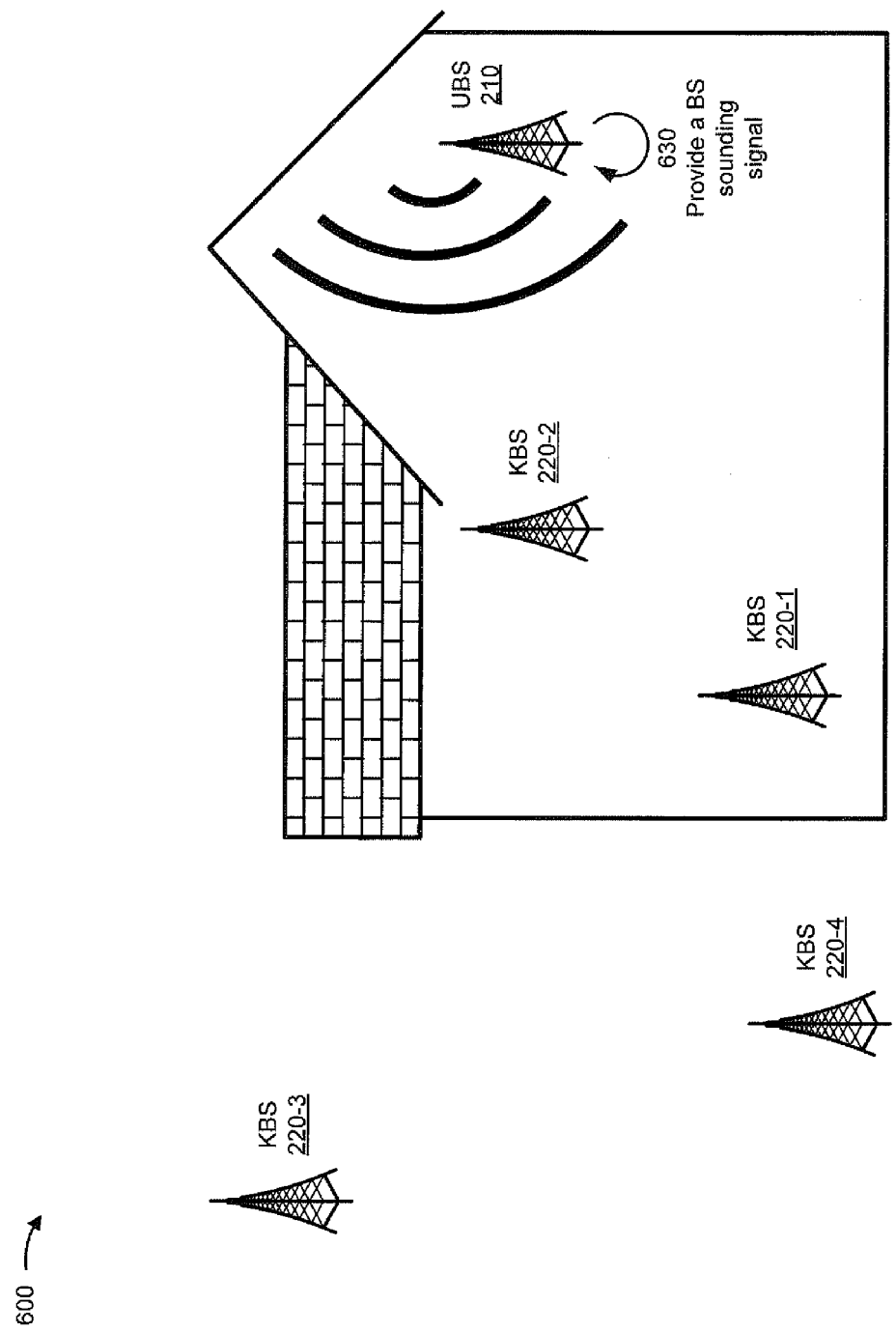

BASE STATION LOCATION DETERMINATION

BACKGROUND

A base station may be deployed in a location that lacks access to a global positioning system (GPS) signal, such as an urban location, an indoor location, or the like. Base station location information is important in determining appropriate spectrum usage, ensuring equipment security, and providing enhanced 9-1-1 (E911) services to user devices.

BRIEF DESCRIPTION OF THE DRAWINGS

FIG. 4 is a flow chart of an example process for determining a location for a base station;

FIGS. 6A-6E are diagrams of another example implementation relating to the example process shown in FIG. 4.

DETAILED DESCRIPTION OF PREFERRED EMBODIMENTS

The following detailed description of example implementations refers to the accompanying drawings. The same reference numbers in different drawings may identify the same or similar elements.

A base station may be deployed in a particular location without being pre-programmed with location information identifying the particular location. Location information may be utilized in spectrum validation, maintenance of equipment security, and support for E911 services for user devices. The base station may utilize a GPS module for determining the location information. However, a GPS signal may be unavailable for determining the location information in a particular location, such as an urban location, an indoor location, or the like. Implementations described herein may facilitate determining a location for a particular base station by utilizing a set of signal measurements and location information associated with one or more other base stations and/or one or more user devices.

Figure 1A:
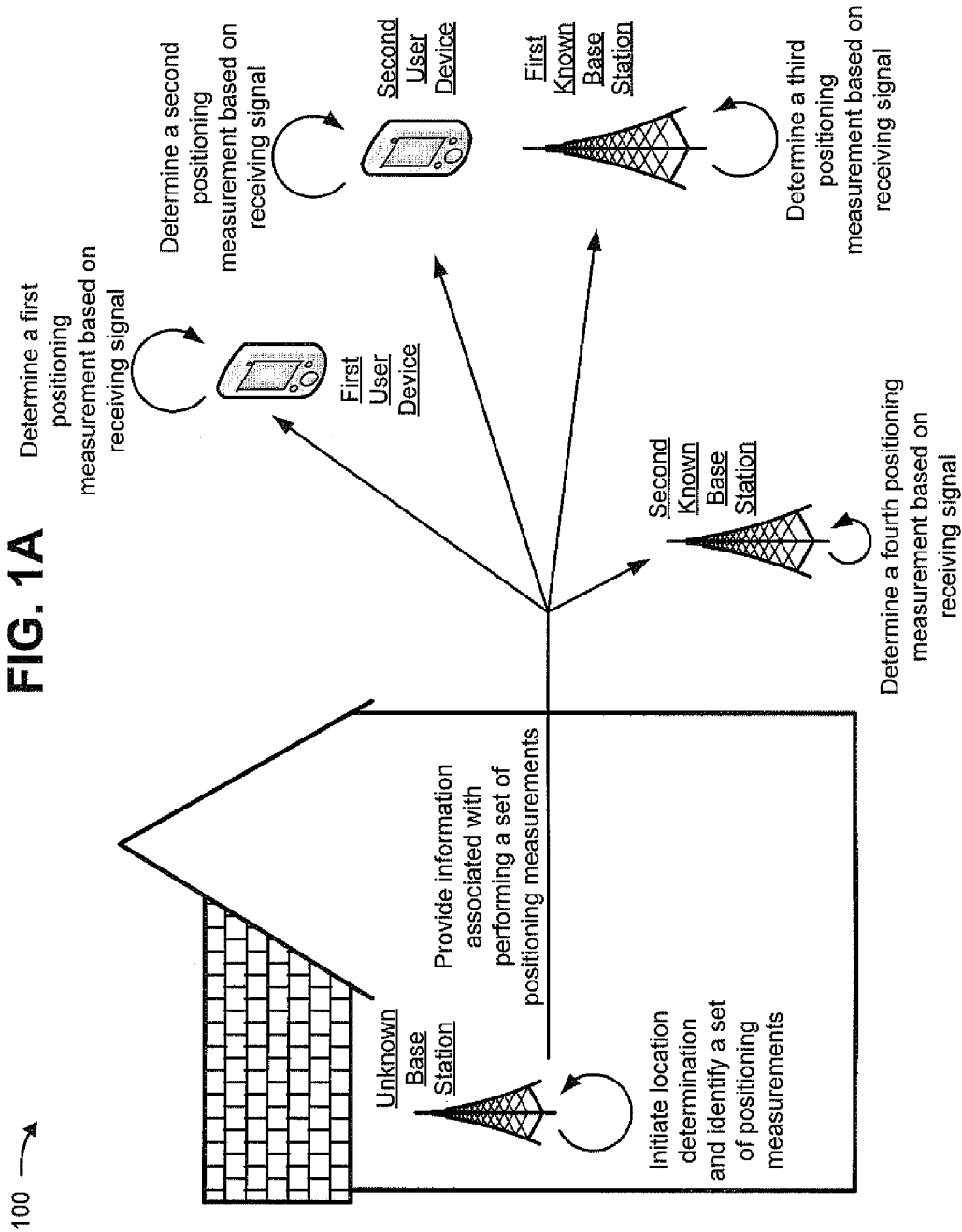
FIGS. 1A and 1B are diagrams of an overview of an example implementation described herein.
Figure 1B:
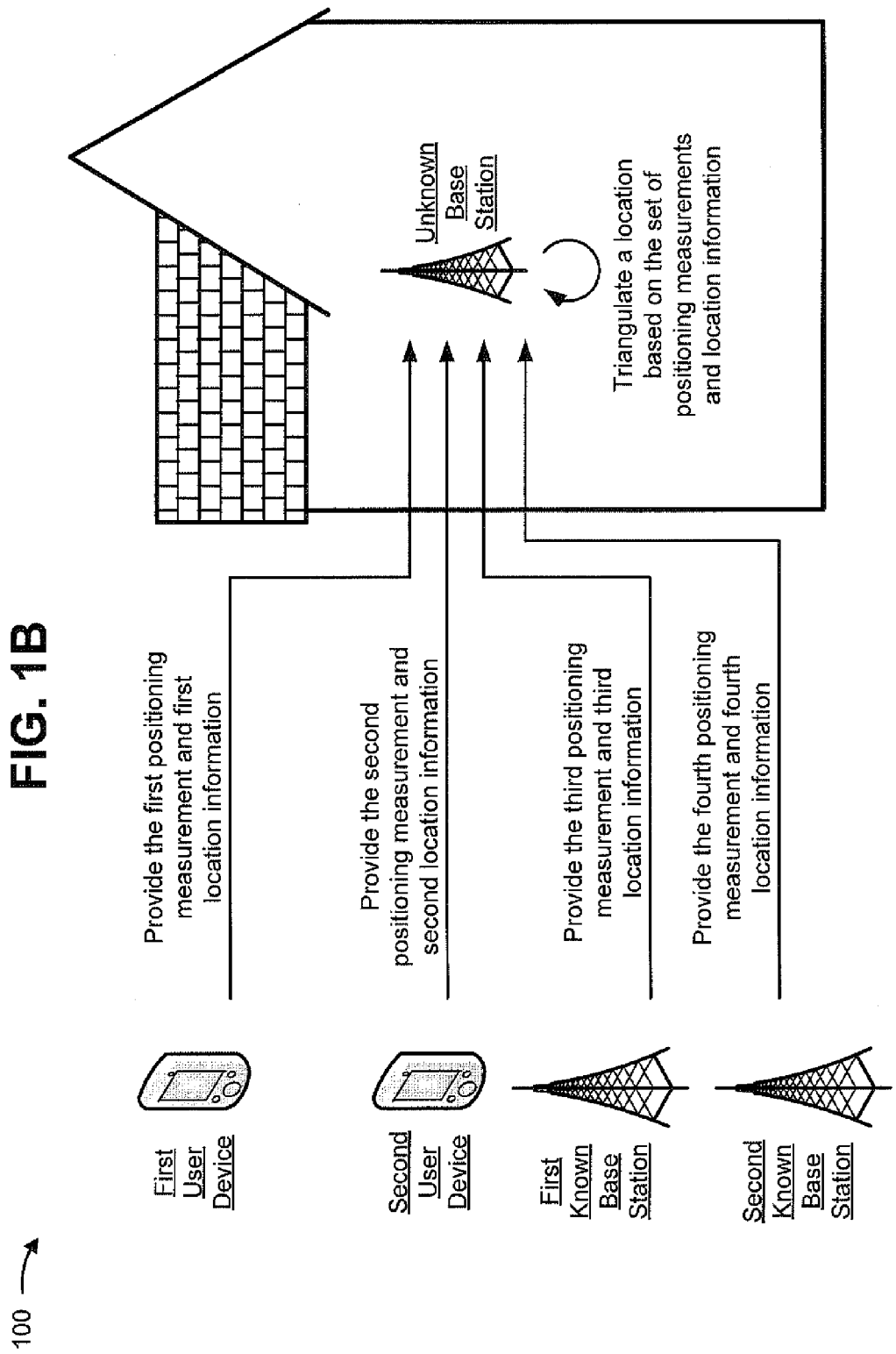

FIGS. 1A and 1B are diagrams of an overview of an example implementation 100 described herein. Example implementation 100 may include an unknown base station (e.g., that lacks access to location information), a set of user devices (e.g., that include access to location information via GPS or the like), such as a first user device and a second user device, and a set of other base stations (e.g., that include access to location information via GPS or the like), such as a first known base station and a second known base station. As shown in FIG. 1A, the unknown base station may initiate location determination to identify a location for the unknown base station. For example, the unknown base station may initiate location determination based on a trigger, such as a periodic timer, a power on event, a user input, a change in the set of other base stations, a request for location information from a positioning server, or the like. The unknown base station may identify a set of positioning measurements, such as a signal strength measurement, a timestamp measurement, or the like, for location determination, and may provide information associated with configuring performance of the set of positioning measurements. For example, the unknown base station may provide information indicating that the unknown base station is to send a particular signal for which a particular positioning measurement is to be performed by the first user device, the second user device, the first known base station, and the second known base station. The unknown base station may send the particular signal for performance of the set of positioning measurements. The first user device, the second user device, the first known base station, and the second known base station may determine (e.g., perform) the set of positioning measurements based on receiving the signal.

As shown in FIG. 1B, the unknown base station may receive a first positioning measurement determined by the first user device, and may receive first location information associated with the first user device (e.g., GPS location information). The unknown base station may receive a second positioning measurement determined by the second user device, and may receive second location information associated with the second user device. The unknown base station may receive a third positioning measurement determined by the first known base station, and may receive third location information associated with the first known base station. The unknown base station may receive a fourth positioning measurement determined by the second known base station, and may receive fourth location information associated with the second known base station. The unknown base station may process the set of positioning measurements (e.g., the first positioning measurement, the second positioning measurement, the third positioning measurement, and the fourth positioning measurement) and the location information to determine the location associated with the unknown base station based on triangulation, trilateration, multi-lateration, or the like.

In another example, the unknown base station may provide information associated with configuring the set of user devices, the set of base stations, etc. to provide a set of signals for performance of the set of positioning measurements. For example, the unknown base station may receive a first signal from the first user device, and may determine the first positioning measurement based on receiving the first signal. The unknown base station may receive a second signal from the second user device, and may determine the second positioning measurement based on receiving the second signal. The unknown base station may receive a third signal from the first known base station, and may determine the third positioning measurement based on receiving the third signal. The unknown base station may receive a fourth signal from the second known base station, and may determine the fourth positioning measurement based on receiving the fourth signal. The unknown base station may receive information identifying locations associated with the first user device, the second user device, the first known base station, and the second known base station (e.g., from a particular positioning server, or the like). Based on the set of positioning measurements and the information identifying the locations, the unknown base station may determine the location associated with the unknown base station. In this way, an unknown base station may determine a location associated with the unknown base station based on determining positioning measurements associated with one or more user devices, one or more known base stations, or the like.

Figure 2:
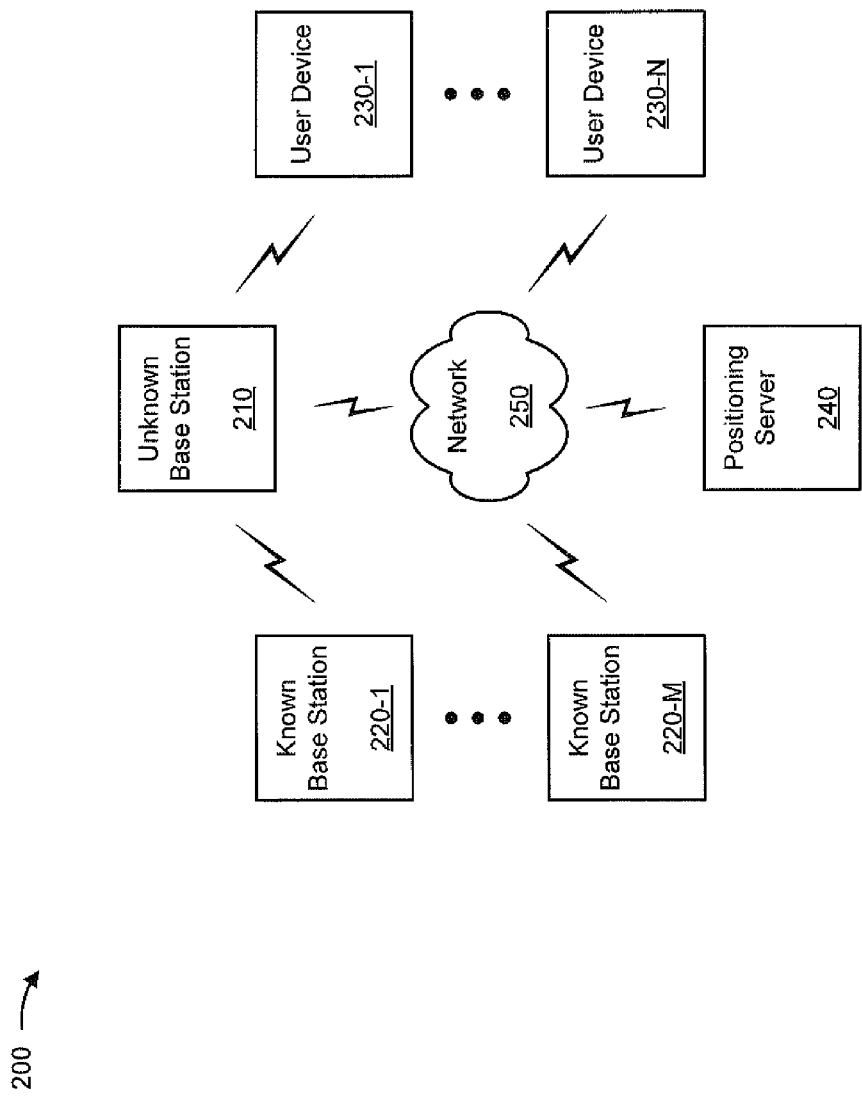
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include unknown base station 210, known base stations 220-1 to 220-M (M≥1) (hereinafter referred to collectively as "known base stations 220," and individually as "known base station 220"), user devices 230-1 to 230-N (N≥1) (hereinafter referred to collectively as "user devices 230," and individually as "user device 230"), positioning server 240, and network 250. Devices of environment 200 may interconnect via wired connections, wireless connections, or a combination of wired and wireless connections.

Unknown base station 210 may include one or more devices capable of receiving, generating, processing, storing, and/or providing network traffic received from and/or destined for user device 230. For example, unknown base station 210 may include a base station, an eNodeB (eNB), a low power base station, an access point of a small cell (e.g., an indoor small cell, a microcell, a picocell, a femtocell, etc.), or the like. In some implementations, unknown base station 210 may refer to a particular base station lacking access (e.g., temporarily lacking access, permanently lacking access, etc.) to location information (e.g. pre-programmed location information, GPS location information, etc.). In some implementations, unknown base station 210 may include one or more self-organizing features, such as automated physical cell identity (PCI) selection, automated neighbor relations, dynamic inter cell interference co-ordination (ICIC), or the like. In some implementations, unknown base station 210 may support one or more location positioning protocols, such as observed time difference of arrival (OTDOA), uplink time difference of arrival (UTDA), or the like.

Known base station 220 may include one or more devices capable of receiving, generating, processing, storing, and/or providing information associated with location determination. For example, known base station 220 may include a base station, an eNB, a low power base station, an access point of a small cell (e.g., an indoor small cell, a microcell, a picocell, a femtocell, etc.), or the like. In some implementations, known base station 220 may refer to a particular base station that includes location information, such as via pre-programming, GPS, OTDOA, UTDA, or the like. In some implementations, known base station 220 may include one or more self-organizing features, such as automated physical cell identity (PCI) selection, automated neighbor relations, dynamic inter cell interference co-ordination (ICIC), or the like. In some implementations, known base station 220 may support location determination for unknown base station 210 via base station assisted (BS assisted) position determination using user equipment (UE) functions (e.g., using a coordinated downlink (DL) positioning reference signal (PRS), using a base station sounding using uplink (UL) sounding reference signal (SRS), etc.) location determination technique.

User device 230 may include one or more devices capable of receiving, generating, processing, storing, and/or providing information associated with location determination. For example, user device 230 may include a mobile phone (e.g., a smart phone), a mobile station, a radiotelephone, a video phone, a personal communications systems (PCS) terminal (e.g., that may combine a cellular radiotelephone with data processing and data communications capabilities), a personal digital assistant (PDA) (e.g., that may include a radiotelephone, a pager, Internet/intranet access, etc.), a computer (e.g., a desktop computer, a laptop computer, a tablet computer, etc.), a video game console, a set-top box, or a similar type of device capable of providing information associated with a positioning measurement to unknown base station 210. In some implementations, user device 230 may include access to location information, such as via GPS, OTDOA, UTDA, or the like. In some implementations, user device 230 may support location determination for unknown base station 210 via mobile station assisted (MS assisted) reverse position determination (e.g., using mobile position estimation, such as via selectively crowd-sourced mobile position determination, explicit position assistance, or the like, using a DL PRS, using a UL SRS, etc.) location determination technique.

Positioning server 240 may include one or more devices capable of receiving, generating, processing, storing, and/or providing information associated with location determination. For example, positioning server 240 may include a network server device, a mobility management entity (MME), a serving gateway (SGW), a packet data network gateway (PGW), a home subscriber server (HSS), a router, hub, a switch, or the like. In some implementations, positioning server 240 may determine one or more known base stations 220, one or more user devices 230, etc., to support location determination for unknown base station 210. In some implementations, positioning server 240 may provide information to unknown base station 210, such as information identifying a positioning measurement, a location, or the like, associated with known base station 220, user device 230, etc.

Network 250 may include one or more wired and/or wireless networks. For example, network 250 may include a cellular network (e.g., a long term evolution (LTE) network, a code division multiple access (CDMA) network, etc.), a public land mobile network (PLMN), a Wi-Fi network, a local area network (LAN), a wide area network (WAN), a metropolitan area network (MAN), a telephone network (e.g., the Public Switched Telephone Network (PSTN)), a near field communication (NFC) network, a Bluetooth network, an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. For example, while unknown base station 210 and positioning server 240 are shown as separate devices, unknown base station 210 and positioning server 240 may be implemented in a single device or in a single collection of devices. Additionally, one or more of the devices of environment 200 may perform one or more functions described as being performed by another one or more devices of environment 200.

Figure 3:
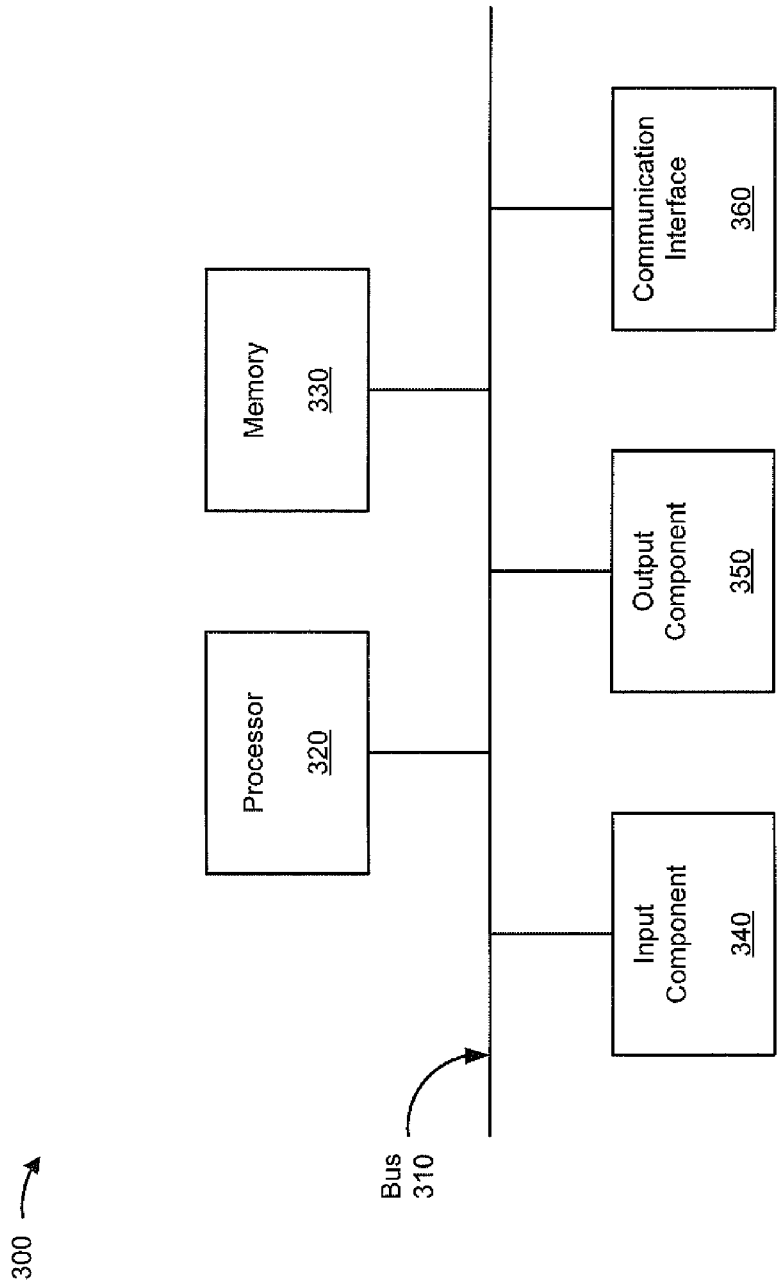
FIG. 3 is a diagram of example components of one or more devices of FIG. 2.

FIG. 3 is a diagram of example components of a device 300. Device 300 may correspond to unknown base station 210, known base station 220, user device 230, and/or positioning server 240. In some implementations, each of unknown base station 210, known base station 220, user device 230, and/or positioning server 240 may include one or more devices 300 and/or one or more components of device 300. As shown in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter, that enables device 300 to communicate with other devices, such as via a wired connection, a wireless connection, or a combination of wired and wireless connections. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions included in a computer-readable medium, such as memory 330. A computer-readable medium is defined herein as a non-transitory memory device. A memory device includes memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3.

FIG. 4 is a flow chart of an example process 400 for determining a location for a base station. In some implementations, one or more process blocks of FIG. 4 may be performed by unknown base station 210. Additionally, or alternatively, one or more process blocks of FIG. 4 may be performed by another device or a group of devices separate from or including unknown base station 210, such as known base station 220, user device 230, and/or positioning server 240.

As shown in FIG. 4, process 400 may include initiating location determination of a location for a base station (block 410). For example, unknown base station 210 may initiate location determination (e.g., by broadcasting a request for location assistance) to identify the location of unknown base station 210. In some implementations, unknown base station 210 may initiate location determination based on an adjustment to a neighbor list (e.g., identifying a previously absent network device, such as known base station 220, user device 230, or the like, determining that a particular network device has generated location information, determining an adjustment to a macrocell PCI, etc.). For example, unknown base station 210 may determine to initiate location determination based on determining that user device 230 may be communicated with during location determination.

Additionally, or alternatively, unknown base station 210 may determine to initiate location determination based on a trigger, such as based on determining that a time threshold has been satisfied, determining that a system status change associated with unknown base station 210 has occurred (e.g., a power reset, a general reset, a startup, etc.), determining a change in a GPS availability associated with unknown base station 210 (e.g., determining that GPS location service is not available), detecting a user input, or the like. In some implementations, unknown base station 210 may initiate location determination based on receiving a request for location information, from known base station 220, user device 230, positioning server 240, another unknown base station 210, or the like.

Unknown base station 210 may select a technique for location determination when initiating location determination, in some implementations. For example, unknown base station 210 may determine to utilize a BS assisted position determination using UE functions technique, an MS assisted reverse position determination technique, or the like. In some implementations, unknown base station 210 may utilize multiple techniques for location determination. For example, unknown base station 210 may determine multiple sets of positioning measurements using the multiple techniques, and may process the multiple sets of positioning measurements to determine location information.

Unknown base station 210 may determine to utilize a particular BS assisted position determination using UE functions technique when determining the technique for location determination, in some implementations. For example, unknown base station 210 may select a coordinated DL PRS location determination technique (e.g., a particular technique associated with a set of known base stations 220 providing a set of DL PRS's to unknown base station 210 for a set of positioning measurements to be performed), a BS sounding using UL SRS location determination technique (e.g., a particular technique associated with unknown base station 210 providing a set of UL SRS's to a set of known base stations 220 for a set of positioning measurements to be performed), or the like.

Additionally, or alternatively, unknown base station 210 may determine to utilize a particular MS assisted reverse position determination technique when determining the technique for location determination. For example, unknown base station 210 may select a mobile position estimation location determination technique, such as a selectively crowd-sourced mobile position estimation location determination technique (e.g., a particular technique associated with multiple user devices 230 providing location estimations for unknown base station 210 to process and generate a location estimation for unknown base station 210), an explicit position assistance location determination technique (e.g., a particular technique associated with a particular user device 230 performing positioning measurements at different locations explicitly indicated by unknown base station 210), or the like. Additionally, or alternatively, unknown base station 210 may select a downlink PRS location determination technique (e.g., a particular technique associated with unknown base station 210 providing a set of DL PRS's to a set of user devices 230 for positioning measurements to be performed), an uplink SRS location determination technique (e.g., a particular technique associated with unknown base station 210 receiving a set of UL SRS's from a set of user devices 230 for positioning measurements to be performed), or the like.

Unknown base station 210 may provide information associated with requesting location assistance when initiating location determination. For example, unknown base station 210 may broadcast a request for location assistance (e.g., a request for one or more known base stations 220, one or more user devices 230, or the like capable of performing a positioning measurement to provide identifying information), and may select the one or more known base stations 220, the one or more user devices 230, or the like for performing positioning measurements based on receiving a response to the request for location assistance.

As further shown in FIG. 4, process 400 may include identifying a set of positioning measurements associated with the location determination (block 420). For example, unknown base station 210 may identify the set of positioning measurements associated with the location determination based on determining to initiate the location determination. A positioning measurement may refer to information associated with a communication between unknown base station 210 and known base station 220, user device 230, or the like, such as a location (e.g., associated with known base station 220, user device 230, etc.), a timestamp (e.g., of a signal associated with the communication), a signal strength (e.g., a quantity of decibels, a quantity of arbitrary strength units (ASU), etc. of the signal associated with the communication), or the like.

In some implementations, unknown base station 210 may identify the set of positioning measurements to be performed based on selecting the location determination technique. For example, when unknown base station 210 selects BS assisted position determination using UE functions utilizing a coordinated DL PRS, unknown base station 210 may determine that a timestamp measurement is to be performed. Additionally, or alternatively, when unknown base station 210 selects a selectively-crowd sourced mobile position determination technique (e.g., an MS assisted reverse position determination), unknown base station 210 may identify location information and/or signal strength as the set of positioning measurements to be performed.

As further shown in FIG. 4, process 400 may include providing configuration information for a set of signals associated with the set of positioning measurements (block 430). For example, unknown base station 210 may provide configuration information for providing and/or receiving the set of signals associated with the set of positioning measurements to known base station 220, user device 230, or the like. In some implementations, unknown base station 210 may provide the configuration information via positioning server 240 (e.g., that may include access to information associated with identifying known base station 220, user device 230, or the like).

The set of signals may refer to a communication of one or more signals between unknown base station 210 and known base stations 220, user devices 230, or the like on which positioning measurements are to be performed. For example, unknown base station 210 may provide one or more signals to known base station 220, user device 230, etc., and known base station 220, user device 230, etc. may perform a positioning measurement (e.g., a measurement of a quality of the signal, such as a signal strength, a timestamp, or the like) based on receiving the one or more signals. Additionally, or alternatively, unknown base station 210 may receive one or more signals from known base station 220, user device 230, etc., and unknown base station 210 may perform a set of positioning measurements based on receiving the one or more signals.

In some implementations, unknown base station 210 may provide information associated with configuring known base stations 220 to receive the set of signals when providing configuration information for the set of signals. For example, when unknown base station 210 has determined to utilize BS assisted position determination using UE functions associated with a set of BS sounding UL SRS's, unknown base station 210 may provide information associated with configuring known base stations 220 to receive the set of BS sounding UL SRS's. Additionally, or alternatively, when unknown base station 210 has determined to utilize BS assisted position determination using UE functions associated with a set of coordinated DL PRS's, unknown base station 210 may provide information associated with configuring known base stations 220 to receive the set of coordinated DL PRS's.

In some implementations, unknown base station 210 may provide configuration information associated with configuring user devices 230 to receive the set of signals when providing configuration information for the set of signals. For example, when unknown base station 210 has determined to utilize MS assisted reverse position determination using mobile position estimation and/or using a set of DL PRS's, unknown base station 210 may provide configuration information associated with receiving the set of signals (e.g., the set of DL PRS's, or the like). Additionally, or alternatively, when unknown base station 210 has determined to utilize MS assisted reverse position determination using UL SRS's, unknown base station 210 may provide information associated with configuring user devices 230 to provide a set of UL SRS's.

Unknown base station 210 may prioritize the one or more known base stations 220, the one or more user devices 230, etc. when providing configuration information, in some implementations. For example, unknown base station 210 may identify a set of known base stations 220, and may select a subset of known base stations 220 to be provided the configuration information. In this case, unknown base station 210 may select the subset of known base stations 220 based on determining a technique for location determination utilized by the subset known base stations 220 (e.g., a GPS determination technique, an OTDOA determination technique, etc.), a signal strength for communications with the subset of known base stations 220, a geographic variation for location information associated with the subset of known base stations 220, or the like. Additionally, or alternatively, unknown base station 210 may select a subset of user devices 230 for communication during location determination. In some implementations, unknown base station 210 may provide configuration information associated with selecting the subset of user devices 230. For example, unknown user device 210 may provide configuration information to positioning server 240, and positioning server 240 may select the subset of user devices 230 based on the configuration information.

Unknown base station 210 may provide information identifying the selected location determination technique when providing the configuration information, in some implementations. For example, unknown base station 210 may provide information identifying a location determination technique identifier, a signal identifier (e.g., a PRS identifier, an SRS identifier, etc.), or the like.

Unknown base station 210 may provide configuration information associated with a characteristic of a signal for the selected location determination technique (e.g., signal identification information), in some implementations. For example, unknown base station 210 may provide time information (e.g., information associated with identifying a period of time during which to detect and/or provide the signal for the selected location determination technique). Additionally, or alternatively, unknown base station 210 may provide frequency information (e.g., information associated with identifying a frequency of the signal for the selected location determination technique). Additionally, or alternatively, unknown base station 210 may provide sequence information (e.g., a particular sequence, a sequence identifier, or the like associated with identifying the signal for the selected location determination technique).

Unknown base station 210 may provide configuration information associated with muting one or more other signals, in some implementations. For example, when unknown base station 210 determines signal identification information associated with a particular signal for the selected location determination technique (e.g., information identifying a particular time, a particular frequency, a particular sequence, etc.), unknown base station 210 may provide configuration information instructing one or more known base stations 220, user devices 230, etc. (e.g., that have been selected not to assist in location determination) to avoid interfering with the particular signal (e.g., by ceasing to provide other signals associated with the particular time, the particular frequency, the particular sequence, etc.).

As further shown in FIG. 4, process 400 may include providing and/or receiving the set of signals associated with the set of positioning measurements based on providing the configuration information (block 440). For example, unknown base station 210 may provide the set of signals to known base stations 220, user devices 230, or the like. Additionally, or alternatively, unknown base station 210 may receive the set of signals from known base stations 220, user devices 230, or the like.

Unknown base station 210 may receive a set of coordinated DL PRS's from a set of known base stations 220, when receiving the set of signals, in some implementations. For example, when unknown base station 210 is utilizing a BS assisted position determination using UE functions location determination technique associated with a coordinated DL PRS signal, unknown base station 210 may receive a particular DL PRS, from known base station 220, and may perform a positioning measurement on the particular DL PRS.

Unknown base station 210 may provide a set of uplink SRS's to a set of known base stations 220, when providing the set of signals, in some implementations. For example, when unknown base station 210 is utilizing a BS assisted position determination using UE functions location determination technique associated with BS sounding using UL SRS's, unknown base station 210 may provide a particular UL SRS to known base station 220, and known base station 220 may perform a positioning measurement on the particular UL SRS.

Unknown base station 210 may provide a set of signals to a set of user devices 230, when providing the set of signals, in some implementations. For example, when unknown base station 210 is utilizing an MS assisted reverse position determination using mobile position estimation location determination technique, unknown base station 210 may provide a particular signal to user device 230, and user device 230 may perform a positioning measurement on the particular signal. Additionally, or alternatively, when unknown base station 210 is utilizing an MS assisted reverse position determination using DL PRS location determination technique, unknown base station 210 may provide a particular DL PRS to user device 230, and user device 230 may perform a positioning measurement on the particular DL PRS.

Unknown base station 210 may receive a set of signals from a set of user devices 230, when receiving the set of signals, in some implementations. For example, when unknown base station 210 is utilizing an MS assisted reverse position determination using UL SRS location determination technique, unknown base station 210 may receive a particular UL SRS from user device 230, and may perform a positioning measurement on the particular UL SRS.

As further shown in FIG. 4, process 400 may include determining the set of positioning measurements based on providing and/or receiving the set of signals (block 450). For example, unknown base station 210 may determine the set of positioning measurements associated with the set of signals. In some implementations, unknown base station 210 may determine the set of positioning measurements based on receiving information identifying one or more positioning measurements from one or more known base stations 220, one or more user devices 230, or the like. For example, when unknown base station 210 provides the set of signals to known base stations 220, known base stations 220 may perform a set of positioning measurements, and may provide the set of positioning measurements to unknown base station 210.

Additionally, or alternatively, unknown base station 210 may determine the set of positioning measurements based on receiving signals from known base stations 220, user devices 230, or the like. For example, when known base stations 220 provide the set of signals to unknown base station 210, unknown base station 210 may receive the set of signals, and may determine the set of positioning measurements based on performing positioning measurements on the received set of signals.

Additionally, or alternatively, unknown base station 210 may determine the set of positioning measurements based on receiving information from positioning server 240, in some implementations. For example, positioning server 240 may receive a positioning measurement performed by known base station 220, user device 230, or the like, and may provide the positioning measurement to unknown base station 210. In some implementations, unknown base station 210 may receive information associated with the positioning measurement. For example, positioning server 240, known base station 220, user device 230, or the like may provide information identifying a location associated with known base station 220, user device 230, or the like. Additionally, or alternatively, unknown base station 210 may receive information identifying an accuracy for a particular positioning measurement, particular location information, or the like.

As further shown in FIG. 4, process 400 may include determining the location for the base station based on determining the set of positioning measurements (block 460). For example, unknown base station 210 may determine the location associated with unknown base station 210 based on determining the set of positioning measurements. In some implementations, unknown base station 210 may determine the location based on processing the set of positioning measurements, such as by performing triangulation, multi-angulation, trilateration, multi-lateration, or the like. For example, unknown base station 210 may utilize a set of timestamps (e.g., associated with receiving a set of signals) and a set of locations for a set of user devices 230 to triangulate the location for unknown base station 210.

In some implementations, unknown base station 210 may apply a weighting factor to one or more positioning measurements of the set of positioning measurements, when determining the location. For example, unknown base station 210 may apply a first weighting factor to a first positioning measurement associated with first location information determined by GPS, and a second weighting factor to a second positioning measurement associated with second location information determined by OTDOA. In some implementations, unknown base station 210 may apply another weighting factor based on accuracy information. For example, unknown base station 210 may determine a particular sensitivity with which a particular positioning measurement has been determined (e.g., based on a data structure storing sensitivity information, based on user device 230 providing sensitivity information, etc.), and may utilize a particular accuracy factor (e.g., based on the particular sensitivity) when determining the location.

In some implementations, unknown base station 210 may utilize other location information, when determining the location associated with unknown base station 210. For example, unknown base station 210 may access other location information identifying a previous location, such as a user defined previous location (e.g., an address, a set of GPS coordinates, etc.), a previous location determined by unknown device 210 (e.g., a particular previous location determined based on a previous set of positioning measurements), or the like. In this case, unknown base station 210 may determine the location based on processing the set of positioning measurements with the other location information.

In some implementation, unknown base station 210 may provide the set of positioning measurements to positioning server 240, when determining the location. For example, unknown base station 210 may provide information associated with the set of positioning measurements for processing by positioning server 240. In this case, unknown base station 210 may receive information identifying the location from positioning server 240. Additionally, or alternatively, unknown base station 210 may register the location with positioning server 240 for spectrum allocation, E911 coordination, or the like.

In this way, an unknown base station may determine a location in which the unknown base station is located based on exchanging a set of signals with a set of known base stations, a set of user devices, or the like, and processing a set of positioning measurements determined therefrom.

Although FIG. 4 shows example blocks of process 400, in some implementations, process 400 may include additional blocks, different blocks, fewer blocks, or differently arranged blocks than those depicted in FIG. 4. Additionally, or alternatively, two or more of the blocks of process 400 may be performed in parallel.

Figure 5A:
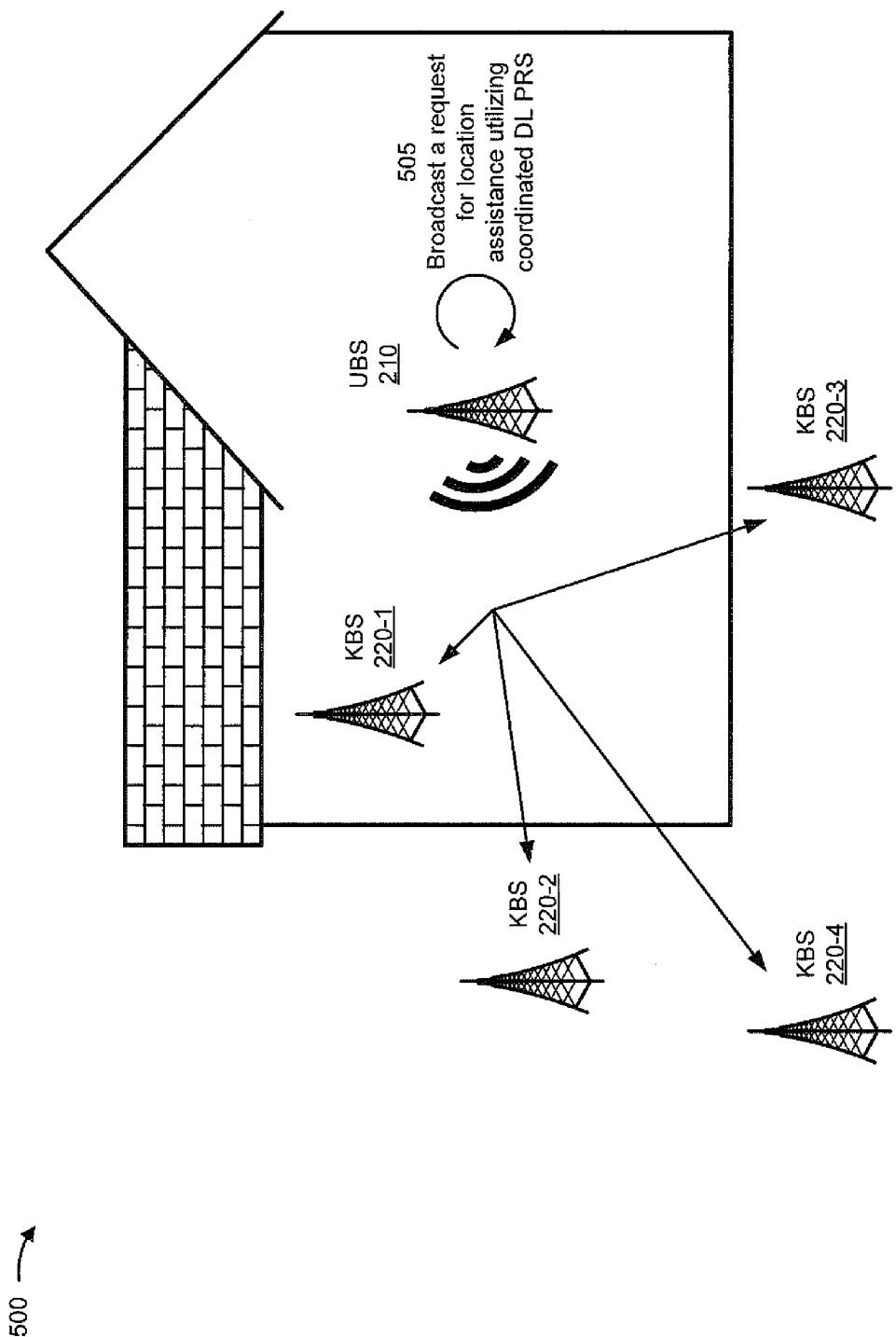
FIGS. 5A-5E are diagrams of an example implementation relating to the example process shown in FIG. 4.

FIGS. 5A-5E are diagrams of an example implementation 500 relating to process 400 shown in FIG. 4. As shown in FIG. 5A, example implementation 500 includes unknown base station 210 (e.g., "UBS 210"), known base station 220-1 (e.g., "KBS 220-1"), known base station 220-2 (e.g., "KBS 220-2"), known base station 220-3 (e.g., "KBS 220-3"), and known base station 220-4 (e.g., "KBS 220-4"). Assume that unknown base station 210 has determined to initiate a location determination utilizing coordinated DL PRS (e.g., a BS assisted position determination using UE functions technique). As shown by reference number 505, unknown base station 210 broadcasts a request for location assistance utilizing coordinated DL PRS to known base station 220-1, known base station 220-2, known base station 220-3, and known base station 220-4.

Figure 5B:
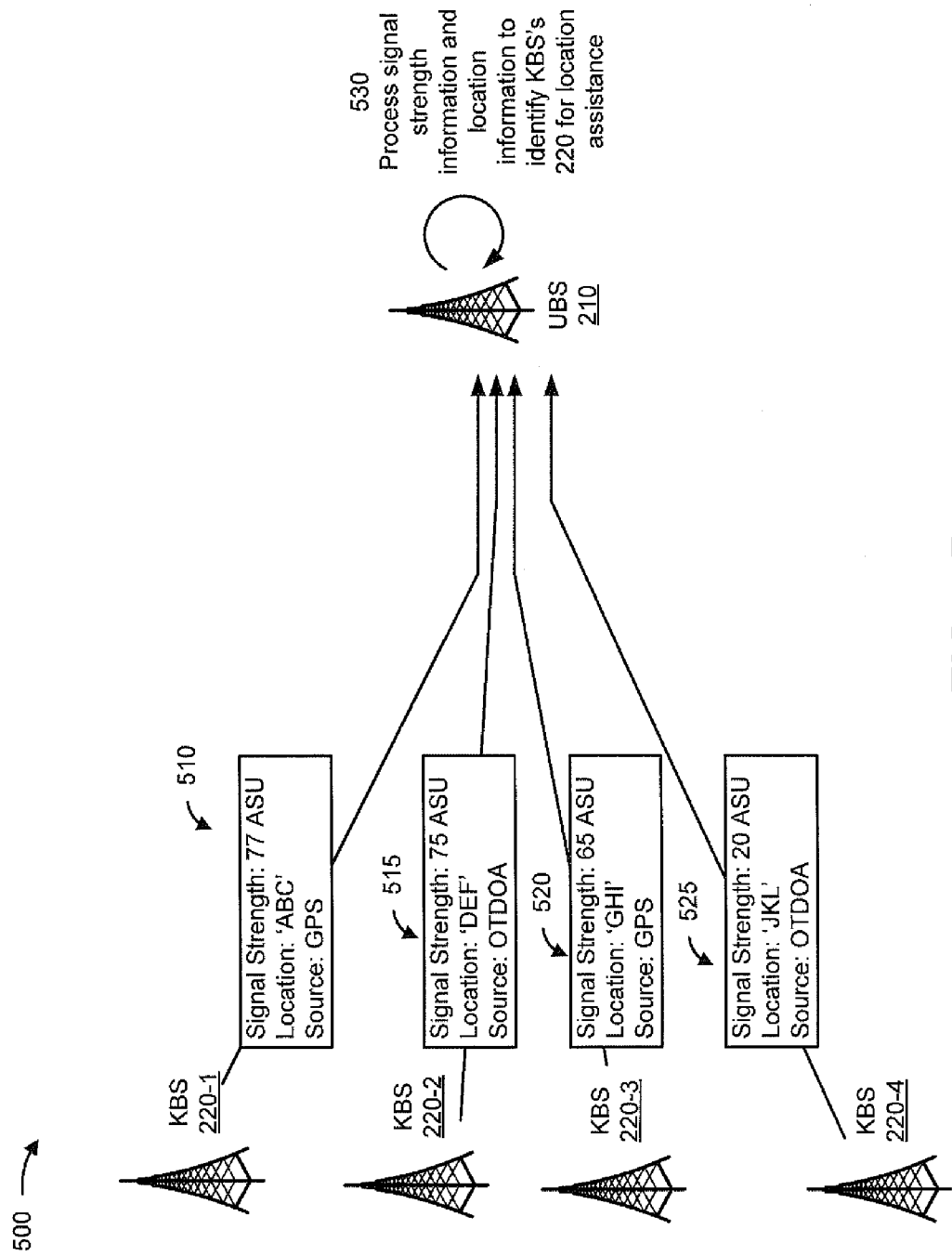

As shown in FIG. 5B, and by reference number 510, known base station 220-1 provides first information to unknown base station 210 identifying a first current signal strength (e.g., "77 ASU"), a first current location (e.g. "ABC"), and a first source for the first current location (e.g., GPS location-based determination). As shown by reference number 515, known base station 220-2 provides second information to unknown user device 210 identifying a second current signal strength, a second current location, and a second source. As shown by reference number 520, known base station 220-3 provides third information to unknown user device 210 identifying a third signal strength, a third current location, and a third source. As shown by reference number 525, known base station 220-4 provides fourth information to unknown user device 210 identifying a fourth signal strength, a fourth current location, and a fourth source. As shown by reference number 530, unknown base station 530 processes the received information to select a set of known base stations 220 for location assistance. Assume that unknown base station 210 selects known base station 220-1, known base station 220-2, and known base station 220-3.

Figure 5C:
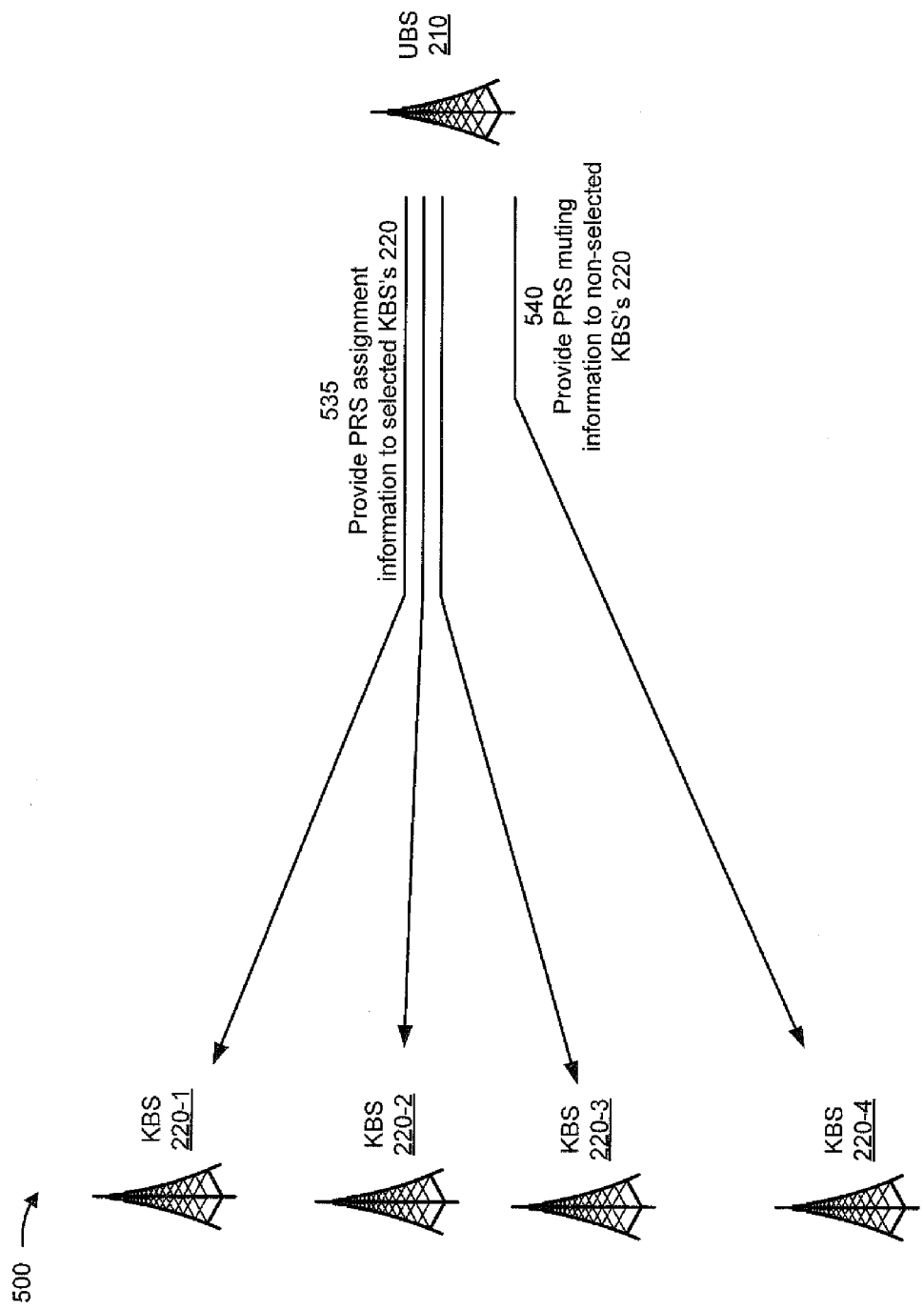

As shown in FIG. 5C, and by reference number 535, unknown base station 210 provides PRS assignment information (e.g., configuration information identifying a time, a frequency, and a sequence for a set of PRS signals) to known base station 220-1, known base station 220-2, and known base station 220-3. As shown by reference number 540, unknown base station 210 provides PRS muting information (e.g., configuration information associated with muting a PRS signal) to known base station 220-4 based on not selecting known base station 220-4 for location assistance.

Figure 5D:
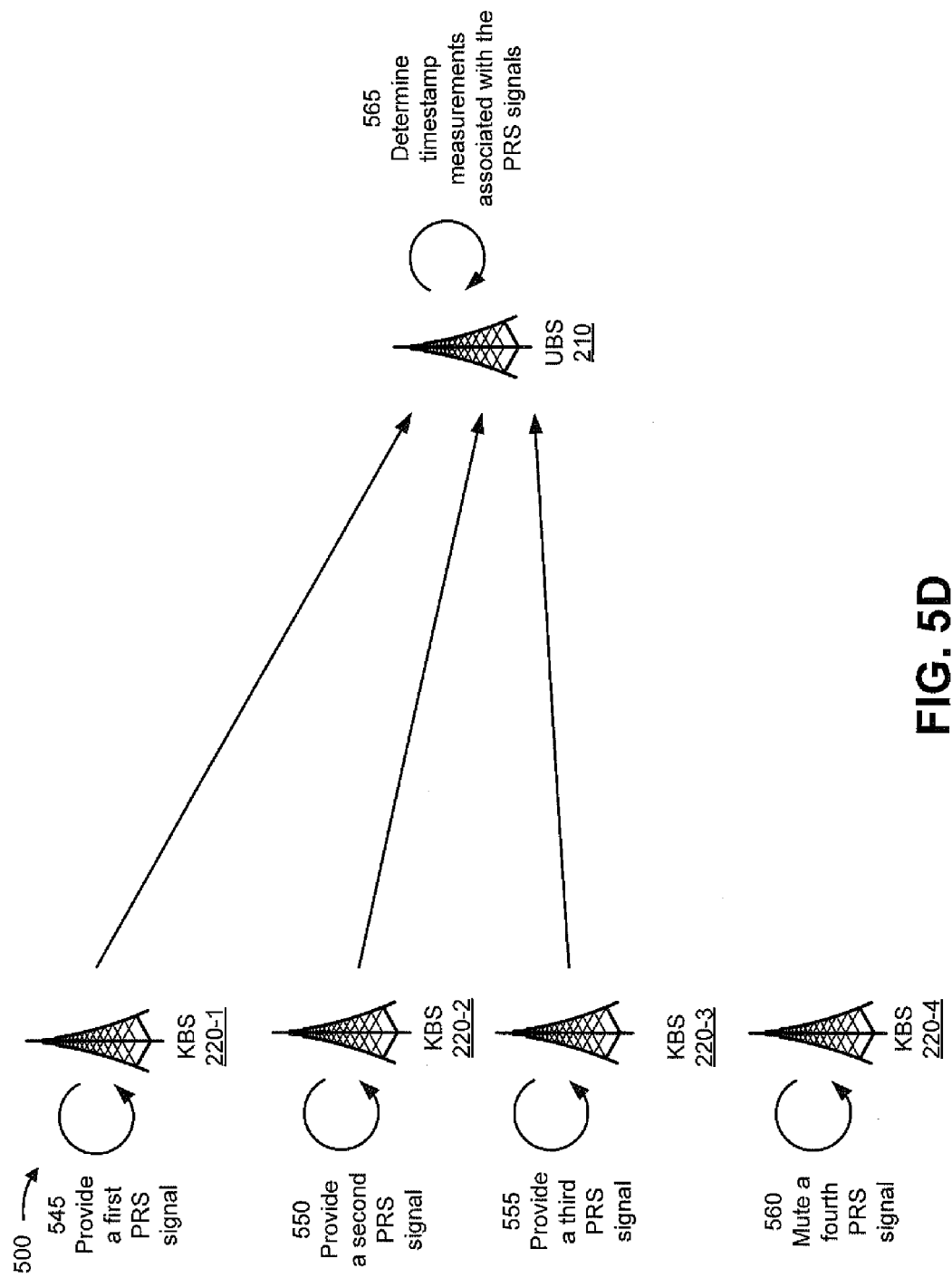

As shown in FIG. 5D, and by reference number 545, known base station 220-1 provides a first PRS signal to unknown base station 210 based on receiving the PRS assignment information. As shown by reference number 550, known base station 220-2 provides a second PRS signal to unknown base station 210 based on receiving the PRS assignment information. As shown by reference number 555, known base station 220-3 provides a third PRS signal to unknown base station 210 based on receiving the PRS assignment information. As shown by reference number 560, known base station 220-4 mutes PRS signaling to avoid interference (e.g., with the first PRS signal, the second PRS signal, and the third PRS signal) during location assistance. As shown by reference number 565, unknown base station 210 records a set of timestamps associated with a set of signals (e.g., the first PRS signal, the second PRS signal, and the third PRS signal) to determine a set of positioning measurements.

Figure 5E:
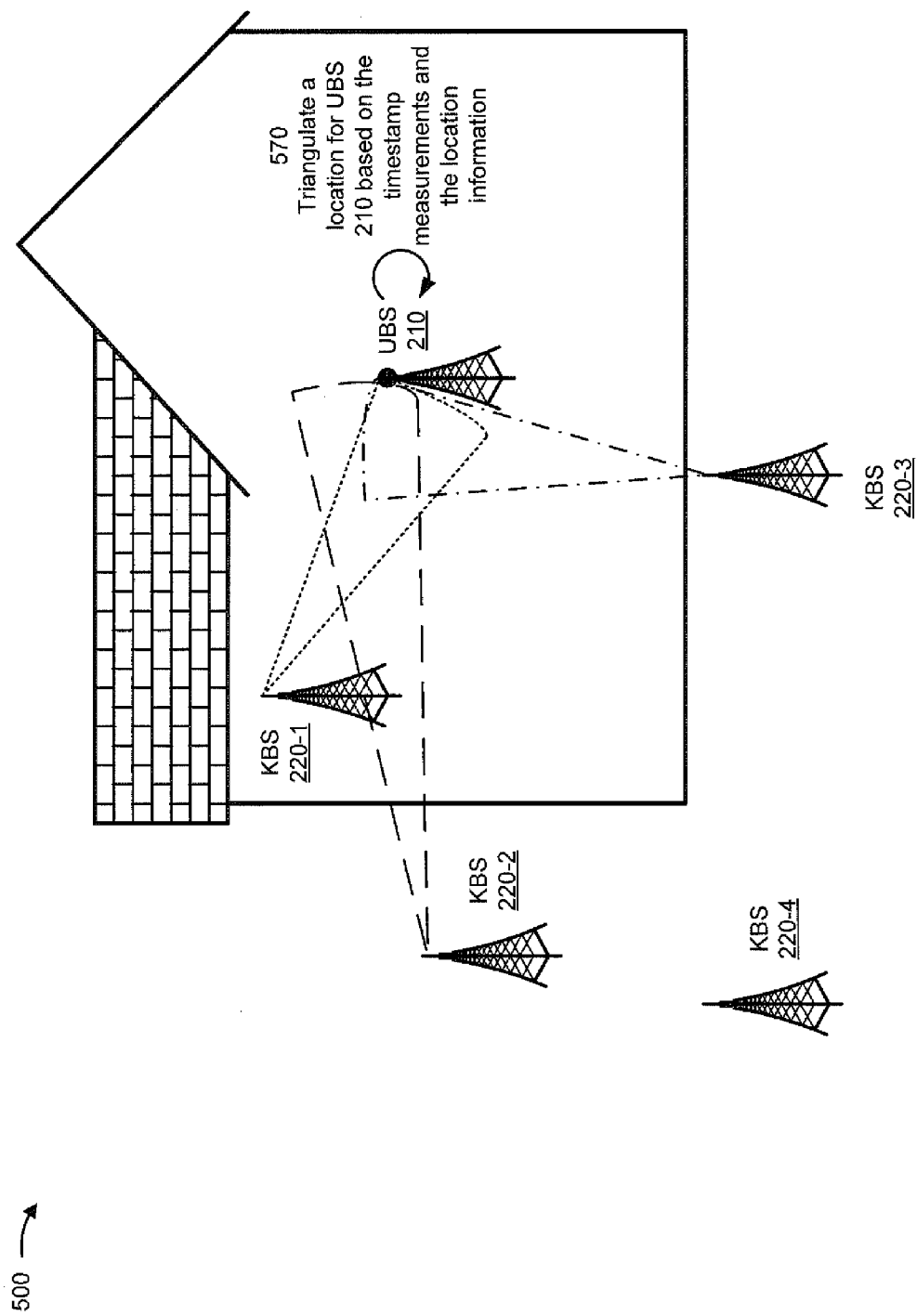

As shown in FIG. 5E, and by reference number 570, unknown base station 210 utilizes the set of positioning measurements and the location information provided by known base station 220-1, known base station 220-2, and known base station 220-3 to triangulate the location for unknown base station 210.

As indicated above, FIGS. 5A-5E are provided merely as an example. Other examples are possible and may differ from what was described with regard to FIGS. 5A-5E.

Figure 6A:
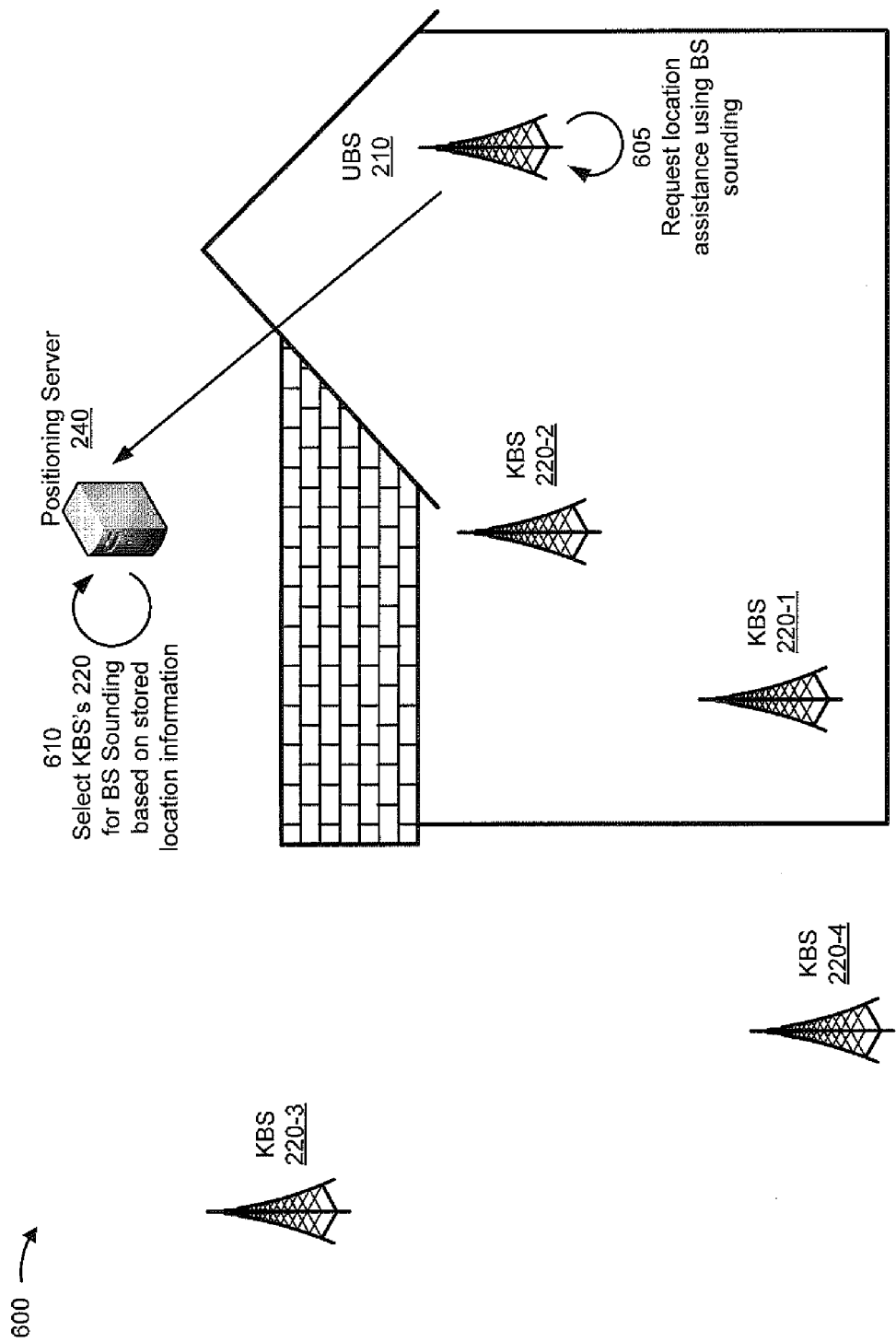

FIGS. 6A-6E are diagrams of an example implementation 600 relating to process 400 shown in FIG. 4. As shown in FIG. 6A, example implementation 600 includes unknown base station 210 (e.g., "UBS 210"), a set of known base stations 220, such as known base station 220-1 (e.g. "KBS 220-1"), known base station 220-2 (e.g., "KBS 220-2"), known base station 220-3 (e.g., "KBS 220-3"), and known base station 220-4 (e.g., "KBS 220-4"), and positioning server 240. Assume that unknown base station 210 has initiated location determination utilizing BS sounding using UL SRS (e.g., a BS assisted position determination using UE functions technique). As shown by reference number 605, unknown base station 210 provides, to positioning server 240, information requesting location assistance. As shown by reference number 610, positioning server 240 receives the request, and selects the set of known base stations 220 for location assistance based on stored information identifying the set of known base stations 220.

Figure 6B:
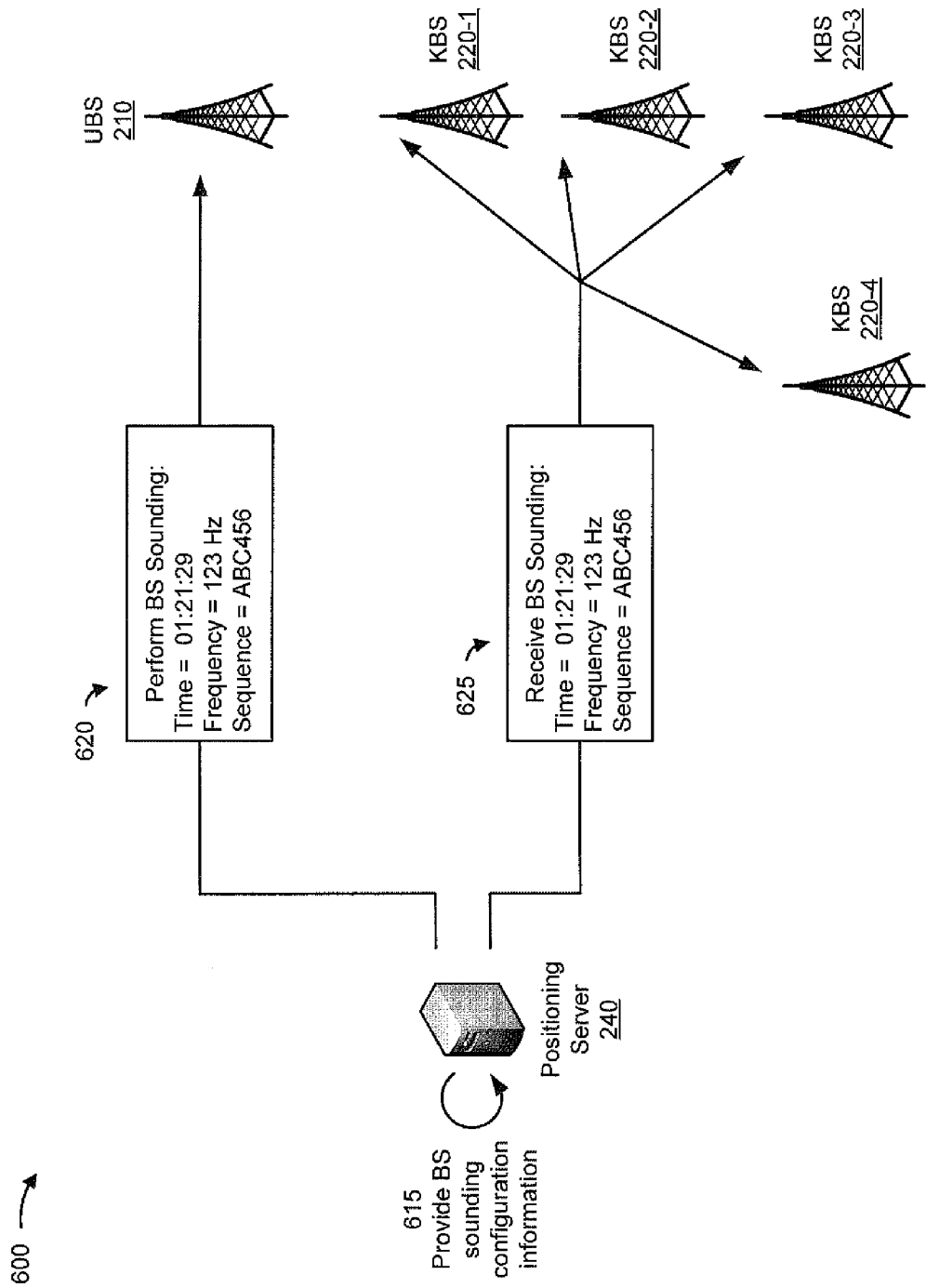

As shown in FIG. 6B, and by reference number 615, positioning server 240 provides BS sounding configuration information to unknown base station 210 and the set of known base stations 220. As shown by reference number 620, BS sounding configuration information provided to unknown base station 210 includes information identifying a time (e.g., "01:21:29"), a frequency (e.g., "123 Hz"), and a sequence (e.g., "ABC456") for providing a signal associated with BS sounding (e.g., a UL SRS). As shown by reference number 625, BS Sounding configuration information provided to the set of known base stations 220 includes information identifying the time, the frequency, and the sequence for receiving the signal associated with BS sounding.

As shown in FIG. 6C, and by reference number 630, unknown base station 210 provides the signal associated with BS sounding to the set of known base stations 220 (e.g., according to the identified time, frequency, and sequence).

Figure 6D:
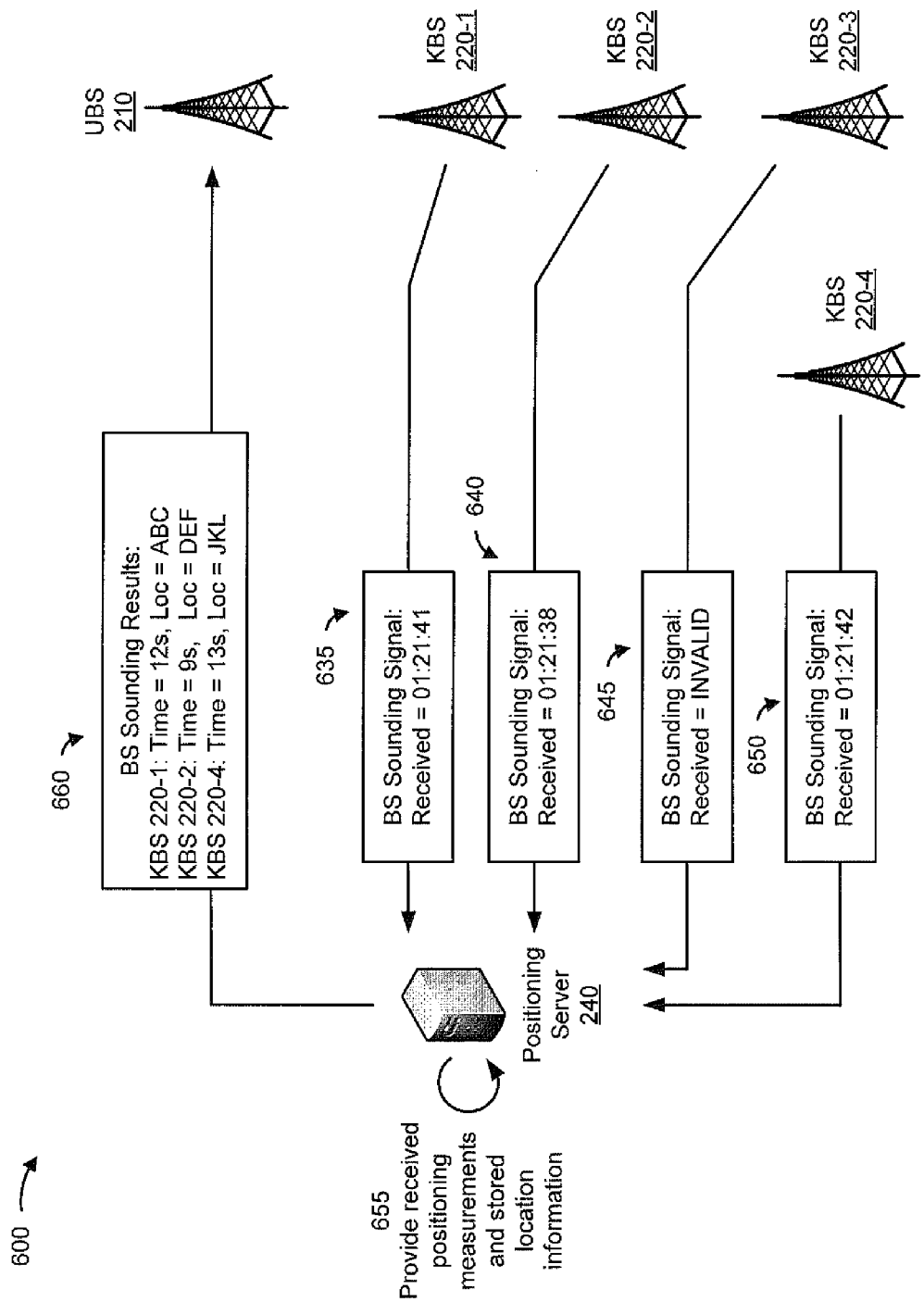

As shown in FIG. 6D, and by reference number 635, known base station 220-1 provides, to positioning server 240, a first positioning measurement (e.g., a timestamp associated with receiving the signal). As shown by reference number 640, known base station 220-2 provides, to positioning server 240, a second positioning measurement. As shown by reference number 645, known base station 220-3 provides, to positioning server 240, information indicating that the signal was not received (e.g., based on a lack of signal strength). As shown by reference number 650, known base station 220-4 provides, to positioning server 240, a third positioning measurement. As shown by reference number 655, positioning server 240 provides BS sounding results to unknown base station 210. As shown by reference number 660, the BS sounding results include a set of positioning measurements (e.g., the first positioning measurement, the second positioning measurement, and the third positioning measurement), and includes a set of location identifiers for the set of known base stations 220.

Figure 6E:
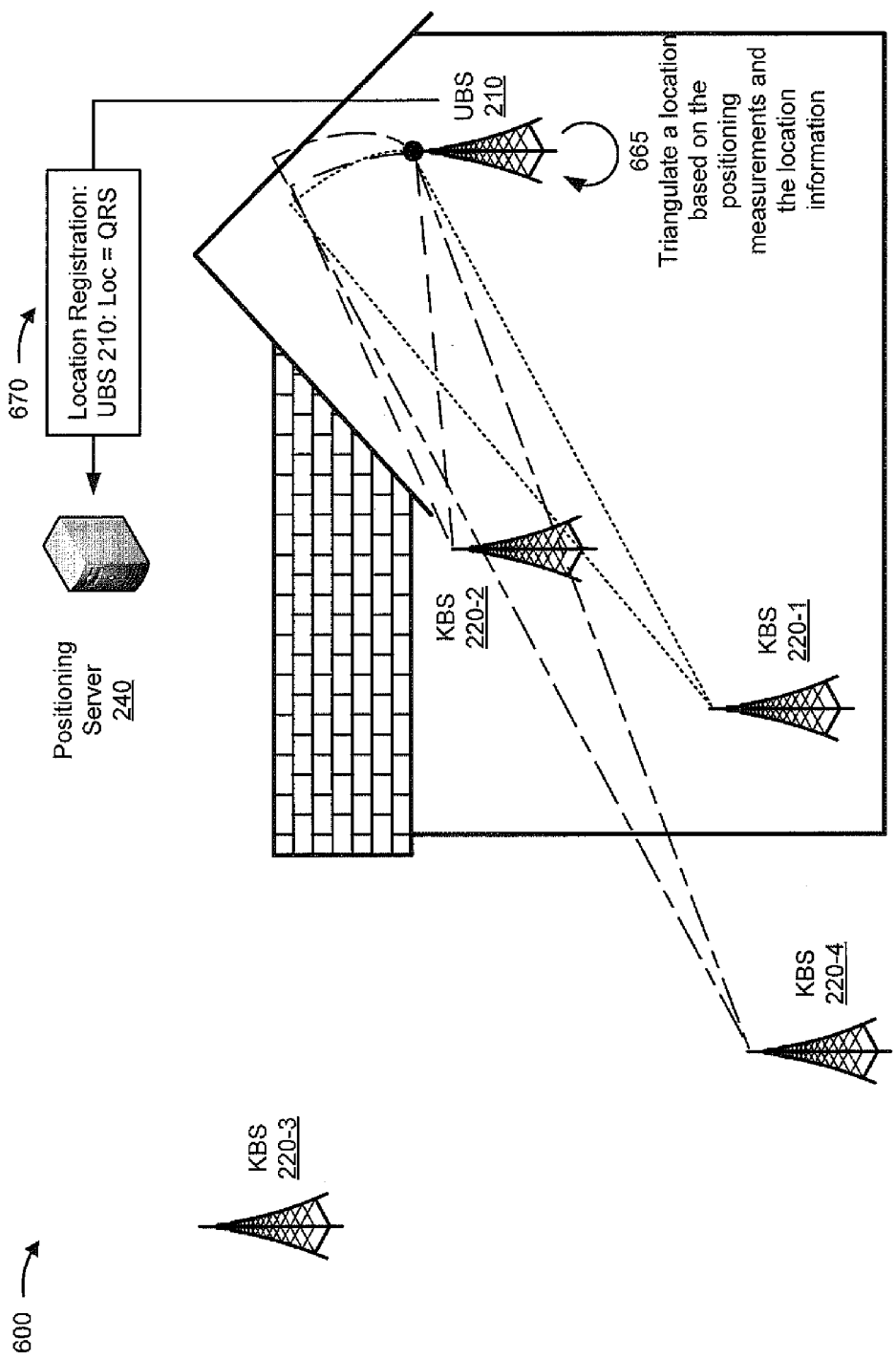

As shown in FIG. 6E, and by reference number 665, unknown base station 210 triangulates a location based on the set of positioning measurements (e.g., the timestamp measurements) and the set of location identifiers. As shown by reference number 670, based on determining the location, unknown base station 210 registers the location (e.g., "Loc=QRS") with positioning server 240.

As indicated above, FIGS. 6A-6E are provided merely as an example. Other examples are possible and may differ from what was described with regard to FIGS. 6A-6E.

Figure 7A:
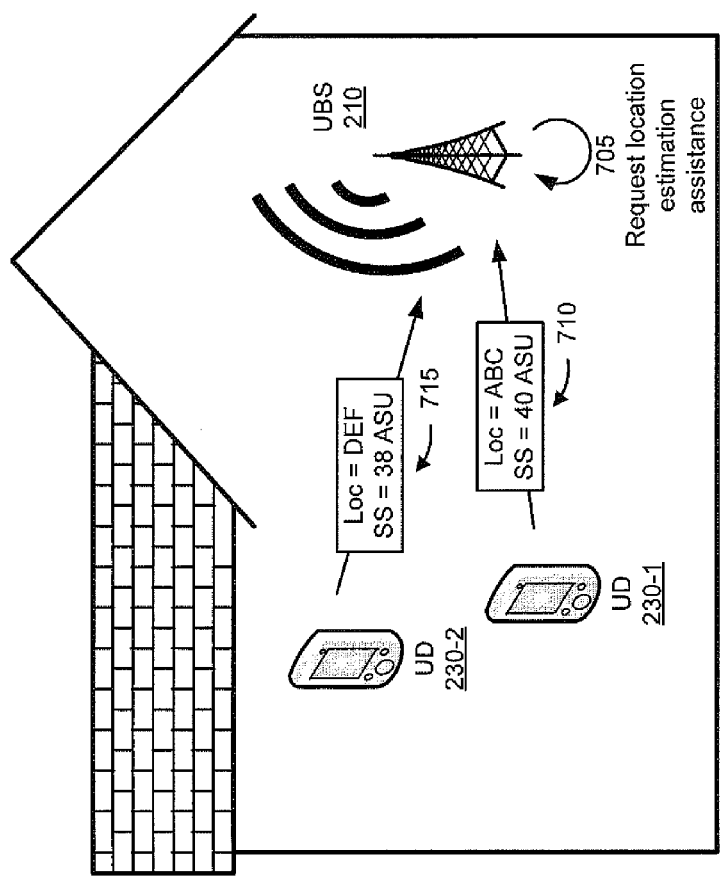
FIGS. 7A-7D are diagrams of yet another example implementation relating to the example process shown in FIG. 4.

FIGS. 7A-7D are diagrams of an example implementation 700 relating to process 400 shown in FIG. 4. As shown in FIG. 7A, example implementation 700 includes unknown base station 210 (e.g., "UBS 210") and a set of user devices 230, such as user device 230-1 (e.g., "UD 230-1") and user device 230-2 (e.g., "UD 230-2"). Assume that unknown base station 210 initiates location determination utilizing mobile position estimation (e.g., an MS assisted reverse position determination technique). As shown by reference number 705, unknown base station 210 broadcasts configuration information requesting location estimation assistance (e.g., requesting available user devices 210 to facilitate location determination). As shown by reference number 710, based on receiving the request for location estimation assistance, user device 230-1 provides a first positioning measurement that includes a first location (e.g., "Loc=ABC") and a first measured signal strength (e.g., "SS=40 ASU") for signals received from unknown base station 210. As shown by reference number 715, user device 230-2 provides a second positioning measurement that includes a second location (e.g., "Loc=DEF") and a second measured signal strength (e.g., "SS=38 ASU").

Figure 7B:
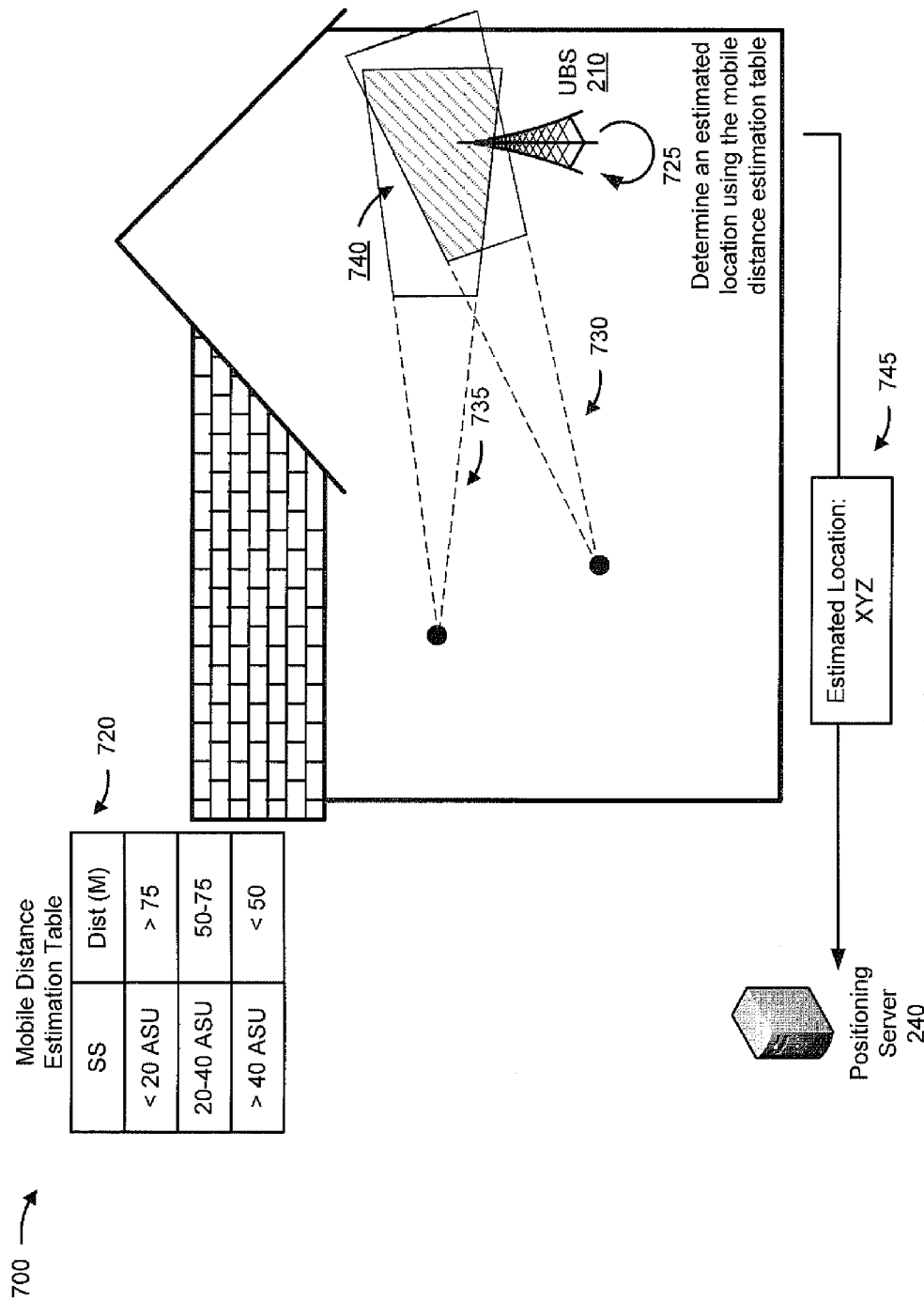

As shown in FIG. 7B, and by reference number 720, unknown base station 210 includes a data structure storing information associated with determining a distance based on a reported signal strength (e.g., "Mobile Distance Estimation Table"). As shown by reference number 725, unknown base station 210 determines an estimated location based on the location information from the set of user devices 230. As shown by reference number 730, unknown base station 210 determines a first estimated location based on the first positioning measurement associated with user device 230-1 and based on accessing the Mobile Distance Estimation Table. As shown by reference number 735, unknown base station 210 determines a second estimated location based on the second positioning measurement associated with user device 230-2 and based on accessing the Mobile Distance Estimation Table. Unknown base station 210 overlays the first estimated location and the second estimated location to generate estimated location 740 (e.g., an estimation of a particular range of locations for unknown base station 210). As shown by reference number 745, unknown base station 210 registers estimated location 740 (e.g., "XYZ") with positioning server 240.

Figure 7C:
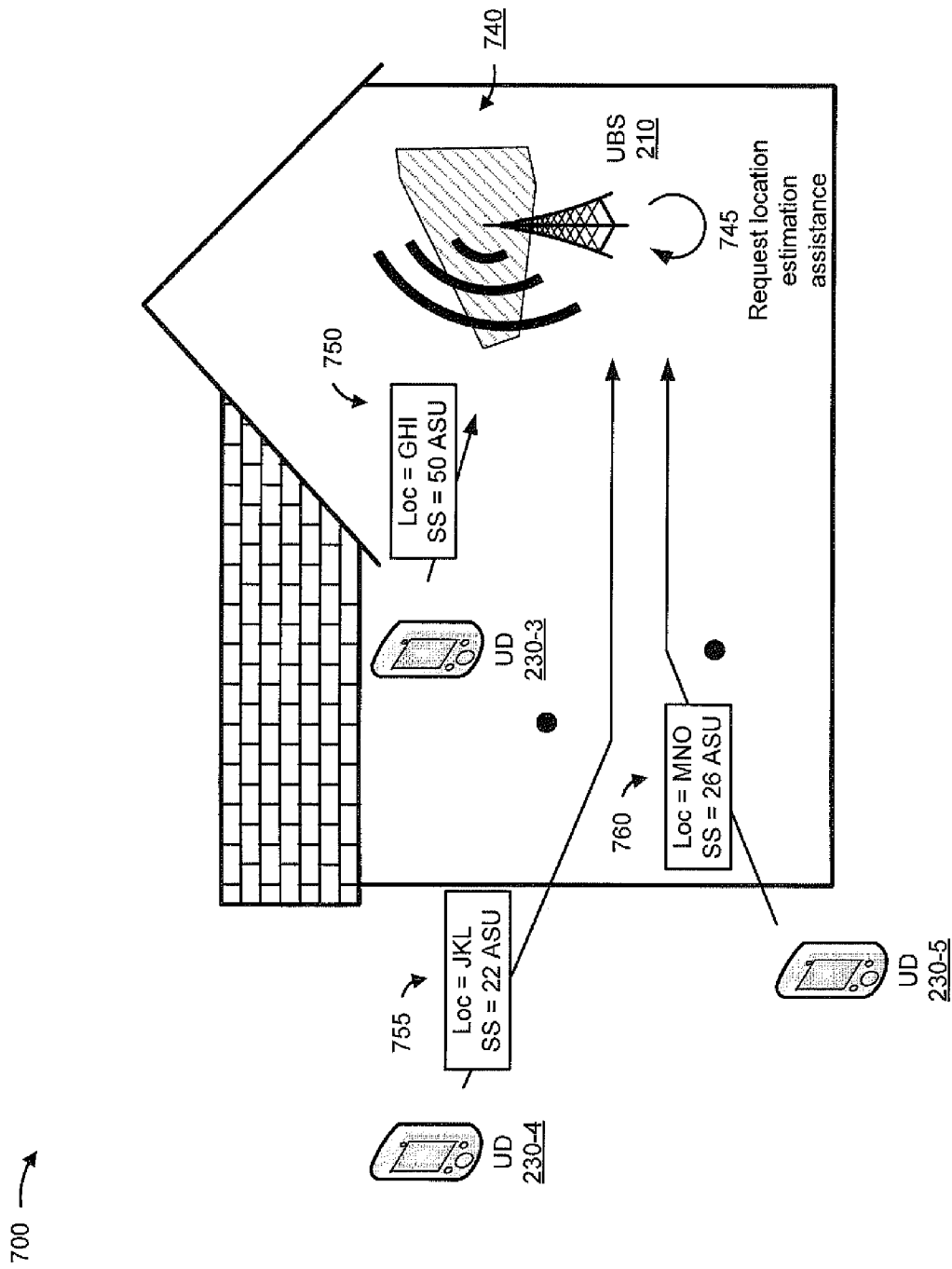

As shown in FIG. 7C, and by reference number 745, unknown base station 210 broadcasts other configuration information requesting location estimation assistance (e.g., to refine estimated location 740 to a more accurate estimation). As shown by reference number 750, user device 230-3 (e.g., "UD 230-3") receives the other configuration information, and provides a third positioning measurement that includes a third location and a third measured signal strength. As shown by reference number 755, user device 230-4 (e.g., "UD 230-4") receives the other configuration information, and provides a fourth positioning measurement that includes a fourth location and a fourth measured signal strength. As shown by reference number 760, user device 230-5 (e.g., "UD 230-5") receives the other configuration information, and provides a fifth positioning measurement that includes a fifth location and a fifth measured signal strength.

Figure 7D:
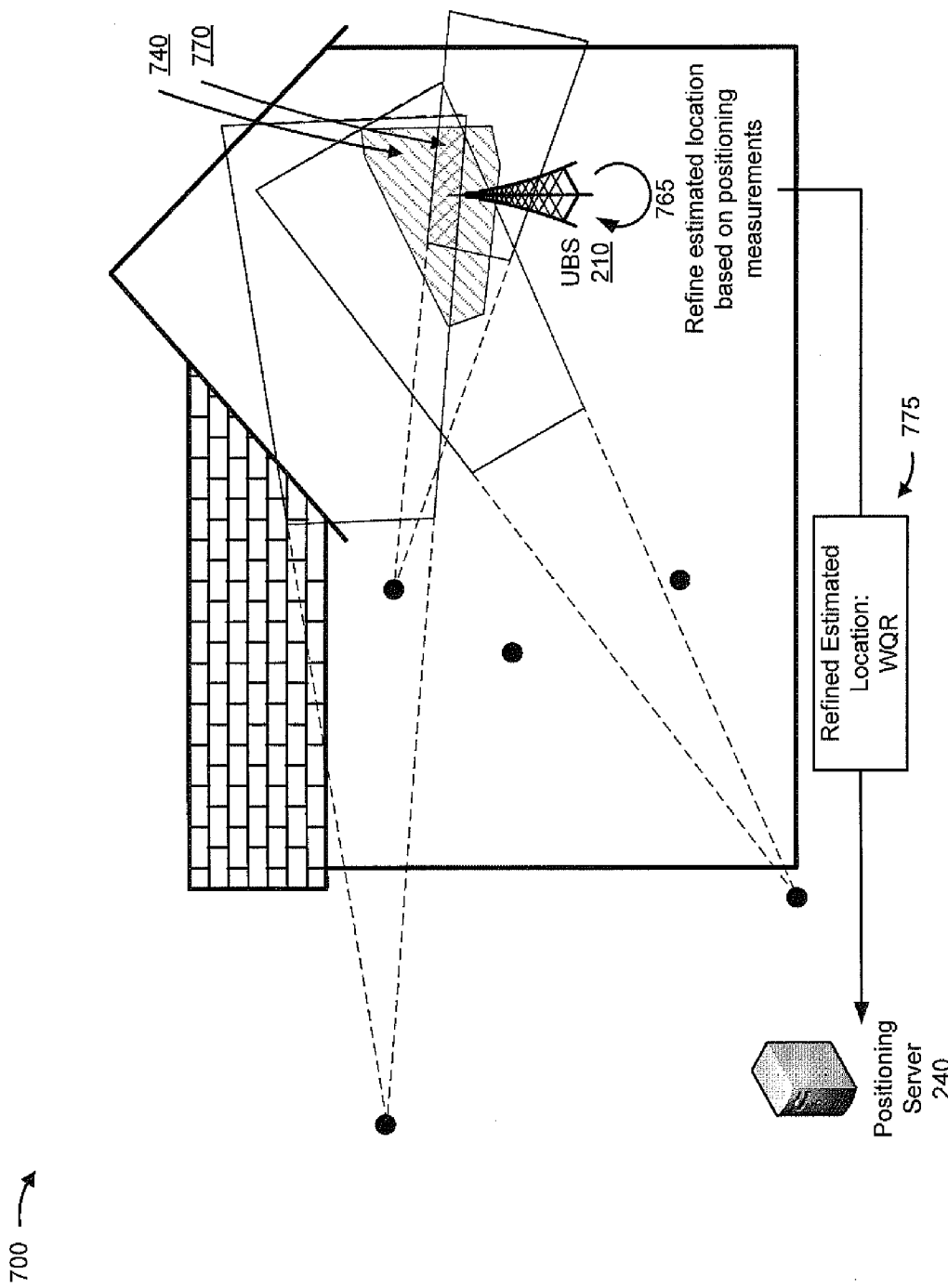

As shown in FIG. 7D, and by reference number 765, unknown base station 210 refines estimated location 740 based on the third positioning measurement, the fourth positioning measurement, and the fifth positioning measurement to generate refined estimated location 770 (e.g., a refined estimation of another particular range of locations for unknown base station 210). As shown by reference number 775, unknown user device 210 registers refined estimated location 770 (e.g., "WQR") with positioning server 240 based on determining refined estimated location 770.

As indicated above, FIGS. 7A-7D are provided merely as an example. Other examples are possible and may differ from what was described with regard to FIGS. 7A-7D.

Implementations described herein may assist a base station in determining a location in which the base station is located based on one or more positioning measurements performed by the base station, a user device, another base station, or the like.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in conjunction with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

To the extent the aforementioned implementations collect, store, or employ personal information provided by individuals, it should be understood that such information shall be used in accordance with all applicable laws concerning protection of personal information. Storage and use of personal information may be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A base station, comprising:
one or more processors to:
initiate a location determination for the base station;
select a first location determination technique and a second location determination technique for the location determination,
the first location determination technique being different than the second location determination technique;
identify a first positioning measurement, associated with the first location determination technique, and a second positioning measurement associated with the second location determination technique, the first positioning measurement being different than the second positioning measurement;
provide information associated with configuring a first device to perform the first positioning measurement and a second device to perform the second positioning measurement;
provide, to the first device, a first signal for performing the first positioning measurement;
provide, to the second device, a second signal for performing the second positioning measurement;
receive, from the first device, information associated with the first positioning measurement based on providing the first signal;
receive, from the second device, information associated with the second positioning measurement based on providing the second signal; and
determine a location in which the base station is located based on the information associated with the first positioning measurement and the information associated with the second positioning measurement.

2. The base station of claim 1, where the first device is another base station different from the base station;
where the one or more processors, when selecting the first location determination technique or the second location determination technique, are to: select a base station assisted position determination using user equipment functions technique, the base station assisted position determination using user equipment functions technique being associated with base station sounding via an uplink sounding reference signal; and
where the one or more processors, when providing the first signal for performing the first positioning measurement, are to:
provide the uplink sounding reference signal to the other base station.

3. The base station of claim 1, where the one or more processors, when receiving the information associated with the first positioning measurement, are to:
receive timestamp information associated with the first signal; and where the one or more processors, when determining the location, are to: tri-laterate the location based on the timestamp information.

4. The base station of claim 1, where the one or more processors, when receiving the information associated with the first positioning measurement, are to:
receive signal strength information associated with the first signal; and
where the one or more processors, when determining the location, are to:
triangulate the location based on the signal strength information.

5. The base station of claim 1, where the first device is a user device;
where the one or more processors are further to:
determine an accuracy factor for the location associated with the base station;
determine that the accuracy factor does not satisfy an accuracy threshold;
where the one or more processors, when determining to initiate the location determination, are to;
initiate the location determination based on determining that the accuracy factor does not satisfy the accuracy threshold; and
where the one or more processors, when selecting the first location determination technique and the second location determination technique, are to:
select a mobile station assisted reverse position determination technique for the location determination, the mobile station reverse position determination technique being associated with utilizing mobile position estimation for the user device.

6. The base station of claim 1, where the first device is a user device;
where the one or more processors are further to:
select a mobile station assisted reverse position determination technique, the mobile station assisted reverse position determination technique being associated with utilizing a downlink positioning reference signal; and
where the one or more processors, when providing the first signal for performing the first positioning measurement, are further to:
provide the downlink positioning reference signal to the user device.

7. The base station of claim 1, where the one or more processors are further to:
determine that a global positioning system location determination module is not available for location determination; and
where the one or more processors, when initiating the location determination, are to:
determine to initiate the location determination based on determining that the global positioning system location determination module is not available for location determination.

8. A non-transitory computer-readable medium storing instructions, the instructions comprising:
one or more instructions that, when executed by one or more processors of a base station, cause the one or more processors to:
initiate a location determination for the base station;
provide information associated with configuring a first device, different than the base station, to provide a first signal associated with the location determination, the first device being associated with a first location;
provide information associated with configuring a second device, different than the base station, to provide a second signal associated with the location determination, the second device being associated with a second location;
receive the first signal based on providing the information associated with configuring the first device to provide the first signal;
receive the second signal based on providing the information associated with configuring the second device to provide the second signal;
generate a first positioning measurement associated with the first signal based on receiving the first signal;
generate a second positioning measurement associated with the second signal based on receiving the second signal, the second positioning measurement being different than the first positioning measurement; and
determine a location in which the base station is located based on:
the first positioning measurement and the first location, and
the second positioning measurement and the second location.

9. The non-transitory computer-readable medium of claim 8, where the first device is another base station that is different than the base station;
where the one or more instructions, when executed by the one or more processors, further cause the one or more processors to:
select a base station assisted position determination using user equipment functions technique for location determination, the base station assisted position determination using user equipment functions technique being associated with a coordinated downlink positioning reference signal; and
where the one or more instructions, that cause the one or more processors to provide the information associated with configuring the first device, cause the one or more processors to:
provide information associated with configuring the other base station to provide the coordinated downlink positioning reference signal.

10. The non-transitory computer-readable medium of claim 8, where the first device is a user device;
where the one or more instructions, when executed by the one or more processors, further cause the one or more processors to:
select a mobile station assisted reverse position determination technique for location determination, the mobile station assisted reverse position determination technique being associated with an uplink sounding reference signal; and
where the one or more instructions, that cause the one or more processors to provide the information associated with configuring the first device, cause the one or more processors to:
provide information associated with configuring the user device to provide the uplink sounding reference signal.

11. The non-transitory computer-readable medium of claim 8, where the one or more instructions, that cause the one or more processors to provide the information associated with configuring the first device to provide the first signal, cause the one or more processors to:
provide a signal identifier associated with the first signal; and where the one or more instructions, that cause the one or more processors to receive the first signal, cause the one or more processors to:
receive the first signal based on identifying the signal identifier associated with the first signal.

12. The non-transitory computer-readable medium of claim 8, where the one or more instructions, that cause the one or more processors to provide the information associated with configuring the first device to provide the first signal, cause the one or more processor to:
provide signal identification information identifying a time and a frequency associated with the first signal;
configure the base station to identify the first signal based on the signal identification information; and
where the one or more instructions, that cause the one or more processors to receive the first signal, cause the one or more processors to:
receive the first signal after configuring the base station to identify the first signal.

13. The non-transitory computer-readable medium of claim 8, where the one or more instructions, when executed by the one or more processors, further cause the one or more processors to:
determine that the location in which the base station is located is unknown; and where the one or more instructions, that cause the one or more processors to initiate the location determination for the base station, cause the one or more processors to:
initiate the location determination based on determining that the location in which the base station is located is unknown.

14. The non-transitory computer-readable medium of claim 8, where the one or more instructions, when executed by the one or more processors, cause the one or more processors to:
identify a set of other positioning measurements;
determine a set of weighting factors associated with the first positioning measurement and the set of other positioning measurements;
process the first positioning measurement and the set of other positioning measurements based on the set of weighting factors; and where the one or more instructions, that cause the one or more processors to determine the location in which the base station is located, cause the one or more processors to:
determine the location in which the base station is located based on processing the positioning measurement and the set of other positioning measurements.

15. A method comprising:
   determining, by a base station, to initiate a location determination for the base station;
      identifying, by the base station, a set of positioning measurements associated with the location determination,
   the set of positioning measurements including a first positioning measurement and a second positioning measurement different than the first positioning measurement,
      the first positioning measurement being associated with a first location determination technique, and
   the second positioning measurement being associated with a second location determination technique that is different than the first location determination technique;
      identifying, by the base station, a set of devices to be associated with the set of positioning measurements;
      providing, by the base station, configuration information for the set of positioning measurements to the set of devices;
      determining, by the base station, information associated with the set of positioning measurements based on providing the configuration information; and
      determining, by the base station, a location in which the base station is located based on determining the information associated with the set of positioning measurements.

16. The method of claim 15, where providing the configuration information for the set of positioning measurements comprises:
   providing information associated with configuring the set of devices to receive a set of signals for the set of positioning measurements;
   providing the set of signals, to the set of devices for reception, based on providing the information associated with configuring the set of devices to receive the set of signals; and
   where determining the information associated with the set of positioning measurements comprises:
   receiving the information associated with the set of positioning measurements based on providing the set of signals,
   the information including the set of positioning measurements, and
   the set of positioning measurements having been determined by the set of devices.

17. The method of claim 15, where providing the configuration information for the set of positioning measurements comprises:
   providing information identifying a set of signals to be generated by the set of devices;
   receiving the set of signals from the set of devices based on providing the information identifying the set of signals to be generated; and
   where determining the information associated with the set of positioning measurements comprises:
   determining the information associated with the set of positioning measurements based on receiving the set of signals.

18. The method of claim 15, where the set of devices include a set of other base stations; and
   where providing the configuration information further comprises:
   identifying one or more particular signals for determining one or more positioning measurements of the set of positioning measurements, the one or more particular signals being associated with one or more communications with the set of other base stations; and
   determining the information associated with the one or more positioning measurements based on identifying the one or more particular signals.

19. The method of claim 15, further comprising:
   identifying an adjustment to a neighbor list associated with the base station; and
   where determining to initiate the location determination for the base station comprises:
   determining to initiate the location determination based on identifying the adjustment to the neighbor list.

20. The method of claim 15, where the set of devices includes one or more user devices and/or one or more other base stations; and
   where determining the location in which the base station is located comprises:
   determining a set of estimated locations in which the base station is located based on the set of positioning measurements; and
   triangulating the location in which the base station is located based on the set of estimated locations.

* * * * *